(12) United States Patent
Lu et al.

(10) Patent No.: US 10,571,704 B2
(45) Date of Patent: Feb. 25, 2020

(54) 3D DISPLAY DEVICE AND DRIVING METHOD THEREOF

(71) Applicants: BOE Technology Group Co., Ltd., Beijing (CN); Beijing BOE Optoelectronics Technology Co., Ltd., Beijing (CN)

(72) Inventors: Pengcheng Lu, Beijing (CN); Xue Dong, Beijing (CN); Xiaochuan Chen, Beijing (CN); Wenqing Zhao, Beijing (CN); Ming Yang, Beijing (CN); Lei Wang, Beijing (CN); Rui Xu, Beijing (CN); Qian Wang, Beijing (CN); Jian Gao, Beijing (CN); Xiaochen Niu, Beijing (CN); Haisheng Wang, Beijing (CN); Shengji Yang, Beijing (CN); Changfeng Li, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 15/536,974

(22) PCT Filed: Oct. 24, 2016

(86) PCT No.: PCT/CN2016/103001
§ 371 (c)(1),
(2) Date: Jun. 16, 2017

(87) PCT Pub. No.: WO2017/118163
PCT Pub. Date: Jul. 13, 2017

(65) Prior Publication Data
US 2018/0107011 A1    Apr. 19, 2018

(30) Foreign Application Priority Data

Jan. 8, 2016 (CN) .......................... 2016 1 0012302

(51) Int. Cl.
*G02B 27/22* (2018.01)
*H04N 13/32* (2018.01)
(Continued)

(52) U.S. Cl.
CPC ....... *G02B 27/2214* (2013.01); *G02B 27/225* (2013.01); *G09G 3/003* (2013.01);
(Continued)

(58) Field of Classification Search
CPC .. G02B 27/2214; G02B 27/225; H04N 13/32; H04N 13/324; G09G 3/36; G09G 3/3607;
(Continued)

(56) References Cited

U.S. PATENT DOCUMENTS

2011/0298832 A1* 12/2011 Lai ...................... G09G 3/3413
345/690
2015/0177438 A1* 6/2015 Drolet .................. G02B 6/0035
349/65
(Continued)

FOREIGN PATENT DOCUMENTS

CN    103533336 A    1/2014
CN    104460115 A    3/2015
(Continued)

OTHER PUBLICATIONS

Jan. 23, 2017—(WO) International Search Report and Written Opinion Appn PCT/CN2016/103001 and English Tran.
(Continued)

*Primary Examiner* — Nathanael R Briggs
(74) *Attorney, Agent, or Firm* — Banner & Witcoff, Ltd.

(57) ABSTRACT

A 3D display device and a driving method thereof are disclosed. The 3D display device includes a backlight module, a liquid crystal display (LCD) panel and a control module; the backlight module includes a light guide plate (LGP) and a plurality of light sources; light emitted by the (Continued)

plurality of light sources is at least partially incident into the LGP; a plurality of grating pixels are disposed on a surface at a light-existing side of the LGP; the LCD panel includes a plurality of light-adjusting pixels; and the control module is connected with the backlight module and the LCD panel, and configured to drive the plurality of light sources to be lit sequentially or simultaneously within a time period of one frame and adjust a gray scale of each light-adjusting pixel in the LCD panel in a time period of lighting each light source.

19 Claims, 11 Drawing Sheets

(51) Int. Cl.
*H04N 13/324* (2018.01)
*G09G 3/00* (2006.01)
*G09G 3/34* (2006.01)
*G09G 3/36* (2006.01)

(52) U.S. Cl.
CPC ......... *G09G 3/3413* (2013.01); *G09G 3/3607* (2013.01); *H04N 13/32* (2018.05); *H04N 13/324* (2018.05); *G09G 2300/0452* (2013.01); *G09G 2310/0235* (2013.01); *G09G 2320/068* (2013.01); *G09G 2320/0666* (2013.01)

(58) Field of Classification Search
CPC ................. G09G 3/003; G09G 3/3413; G09G 2300/0452; G09G 2310/0235; G09G 2320/0666; G09G 2320/068
See application file for complete search history.

(56) References Cited

U.S. PATENT DOCUMENTS

2016/0370594 A1* 12/2016 Santori ................... G02B 27/22
2017/0082864 A1    3/2017 Zhao et al.
2017/0154555 A1    6/2017 Wei
2017/0363794 A1* 12/2017 Wan ........................ G02B 27/22

FOREIGN PATENT DOCUMENTS

| | | |
|---|---|---|
| CN | 104570371 A | 4/2015 |
| CN | 104777621 A | 7/2015 |
| CN | 104978941 A | 10/2015 |
| CN | 105223641 A | 1/2016 |
| JP | 2012128191 A | 7/2012 |
| WO | 2014204471 A1 | 12/2014 |
| WO | 2015016842 A1 | 2/2015 |

OTHER PUBLICATIONS

Nov. 8, 2018—(CN) First Office Action Appn 201610012302.X with English Translation.

\* cited by examiner

3D DISPLAY DEVICE AND DRIVING METHOD THEREOF

The application is a U.S. National Phase Entry of International Application No. PCT/CN2016/103001 filed on Oct. 24, 2016, designating the United States of America and claiming priority to Chinese Patent Application No. 201610012302.X, filed Jan. 8, 2016. The present application claims priority to and the benefit of the above-identified applications and the above-identified applications are incorporated by reference herein in their entirety.

TECHNICAL FIELD

Embodiments of the present disclosure relate to a three-dimensional (3D) display device and a driving method thereof.

BACKGROUND

With the development of science and technology and the improvement of quality of life, people are no longer satisfied with the traditional two-dimensional (2D) image display devices, and 3D display technology has become today's eye-catching display technology. Currently, users generally need to use external aids such as polarized glasses, complementary glasses and liquid crystal glasses to view 3D images, and hence users cannot do other work while watching the monitor, and the vision is limited. Therefore, naked-eye 3D display technology without external aids becomes a research hotspot in the field of display technology in the current world.

Naked-eye 3D (three-dimensional) display technology is developed on the basis of binocular parallax. The naked-eye 3D display technology mainly includes grating-type 3D display technology. The grating can be a parallax barrier or a lenticular lens. Because the grating has a light splitting function, the grating has an effect of separating images when applied in a display device.

SUMMARY

Embodiments of the present disclosure provide a 3D display device and a driving method thereof, which can improve the resolution of the 3D display device.

An aspect of the embodiment of the present disclosure provides a 3D display device, which comprises a backlight module, a liquid crystal display (LCD) panel and a control module; the backlight module comprises a light guide plate (LGP) and a plurality of light sources; light emitted by the plurality of light sources is at least partially incident into the LGP; the plurality of light sources at least comprise a first light source, a second light source and a third light source; the colors of the light emitted by the first light source, the second light source and the third light source are three primary colors; a plurality of grating pixels are disposed on a surface at a light-exiting side of the LGP; each grating pixel at least comprises a first grating sub-pixel, a second grating sub-pixel and a third grating sub-pixel, which are respectively configured to filter for transmit the light emitted by the first light source, the second light source and the third light source; the LCD panel comprises a plurality of light-adjusting pixels; the light-adjusting pixels have a one-to-one correspondence with the grating pixels; and the control module is connected with the backlight module and the LCD panel, and configured to drive the plurality of light sources to be lit sequentially or simultaneously within a time period of one frame, and adjust a gray scale of each light-adjusting pixel in the LCD panel in a time period of lighting each light source.

For example, the plurality of light sources are each disposed at a side surface of the LGP.

For example, an emergent light of at least partial grating sub-pixels in each of the grating pixels has different angles.

For example, the plurality of light sources further comprise a fourth light source which emits any one of cyan (C) light, magenta (M) light and yellow (Y) light; and the grating pixel further comprises a fourth grating sub-pixel which is configured to filter for transmit the light emitted by the fourth light source; a cross section of the LGP is a quadrangle; and the first light source, the second light source, the third light source and the fourth light source are respectively disposed at four side surfaces of the LGP.

For example, the plurality of light sources further comprise a fourth light source and a fifth light source; the fourth light source emits cyan light; the fifth light source emits magenta light or yellow light; and the grating pixel further comprises a fourth grating sub-pixel and a fifth grating sub-pixel which are respectively configured to filter for transmit the light emitted by the fourth light source and the light emitted by the fifth light source; a cross section of the LGP is a pentagon; and the first light source, the second light source, the third light source, the fourth light source and the fifth light source are respectively disposed at five side surfaces of the LGP.

For example, the plurality of light sources further comprise a fourth light source, a fifth light source and a sixth light source; the fourth light source emits cyan light; the fifth light source emits magenta light; the sixth light source emits yellow light; and the grating pixel further comprises a fourth grating sub-pixel, a fifth grating sub-pixel and a sixth grating sub-pixel which are respectively configured to filter for transmit the light emitted by the fourth light source, the fifth light source and the sixth light source; a cross section of the LGP is a hexagon; and the first light source, the second light source, the third light source, the fourth light source, the fifth light source and the sixth light source are respectively disposed at six side surfaces of the LGP.

For example, the light-adjusting pixel comprises a plurality of light-adjusting sub-pixels; and the light-adjusting sub-pixels have a one-to-one correspondence with the grating sub-pixels.

Another aspect of the embodiment of the present disclosure provides a method for driving the above 3D display device, which comprises: driving a plurality of light sources to be lit in sequence within a time period of one frame; and adjusting a gray scale of each light-adjusting pixel in an LCD panel in a time period of lighting each light source.

For example, in the case that the plurality of light sources comprise a first light source, a second light source, a third light source and a fourth light source, and each grating pixel at least comprises a first grating sub-pixel, a second grating sub-pixel, a third grating sub-pixel and a fourth grating sub-pixel, the driving method comprises: lighting the first light source in a first time period of one frame, performing progressive scanning via gate lines of the LCD panel, and charging light-adjusting pixels via data lines, so as to make the light emitted by the first light source transmits through the first grating sub-pixels and incidents on the light-adjusting pixels corresponding to the first grating sub-pixels; lighting the second light source in a second time period of one frame, performing progressive scanning via the gate lines of the LCD panel, and charging the light-adjusting pixels via the data lines, so as to make the light emitted by the second light source transmits through the second grating sub-pixels and incidents on the light-adjusting pixels corresponding to the second grating sub-pixels; lighting the third light source in a third time period of one frame, performing progressive scanning via the gate lines of the LCD panel, and charging the light-adjusting pixels via the data lines, so as to make the light emitted by the third light source transmits through the third grating sub-pixels and incidents on the light-adjusting pixels corresponding to the third grating sub-pixels; and lighting the fourth light source in a fourth time period of one frame, performing progressive scanning via the gate lines of the LCD panel, and charging the light-adjusting pixels via the data lines, so as to make the light emitted by the fourth light source transmits through the fourth grating sub-pixels and incidents on the light-adjusting pixels corresponding to the fourth grating sub-pixels.

For example, the first time period, the second time period, the third time period and the fourth time period respectively occupy one quarter of the time period of one frame.

For example, in the case that the light sources further comprise a fifth light source and the grating pixel further comprises a fifth grating sub-pixel, the driving method further comprises: lighting the fifth light source in a fifth time period of one frame, performing progressive scanning via the gate lines of the LCD panel, and charging the light-adjusting pixels via the data lines, so as to make the light emitted by the fifth light source can transmits through the fifth grating sub-pixels and incidents on the light-adjusting pixels corresponding to the fifth grating sub-pixels.

For example, the first time period, the second time period, the third time period, the fourth time period and the fifth time period respectively occupy one fifth of the time period of one frame.

For example, in the case that the light sources further comprise a sixth light source and the grating pixel further comprises a sixth grating sub-pixel, the driving method further comprises: lighting the sixth light source in a sixth time period of one frame, performing progressive scanning via the gate lines of the LCD panel, and charging the light-adjusting pixels via the data lines, so as to make the light emitted by the sixth light source can transmits through the sixth grating sub-pixels and incidents on the light-adjusting pixels corresponding to the sixth grating sub-pixels.

For example, the first time period, the second time period, the third time period, the fourth time period, the fifth time period and the sixth time period respectively occupy one sixth of the time period of one frame.

Further another aspect of the embodiment of the present disclosure provides a method for driving the above 3D display device, which comprises: driving a plurality of light sources to be lit simultaneously within a time period of one frame, and adjusting a gray scale of each light-adjusting pixel in an LCD panel.

For example, adjust a gray scale of each light-adjusting sub-pixel in the light-adjusting pixel of the LCD panel within the time period of one frame.

BRIEF DESCRIPTION OF THE DRAWINGS

In order to clearly describe the technical solutions in the embodiments of the present disclosure or in the prior art, in the following, the accompanying drawings used in the description of the embodiments or the prior art will be briefly described. It is apparent that the accompanying drawings described below are only some embodiments of the present disclosure, and other accompanying drawings can also be obtained by those skilled in the art without creative efforts based on the accompanying drawings.

FIG. 1b is a schematic diagram illustrating the correspondence between a pixel unit and grating sub-pixels of a liquid crystal display (LCD) panel in FIG. 1a;

FIG. 3b is a schematic structural view of grating sub-pixels and a LGP in FIG. 3a;

FIG. 3c is another schematic structural view of the grating sub-pixels and the LGP in FIG. 3a;

FIG. 3d is a schematic diagram illustrating a configuration of the grating sub-pixels in FIG. 3a;

FIG. 3e is a control signal timing diagram of the backlight module illustrated in FIG. 3a;

FIG. 4b is a schematic diagram illustrating a color gamut of a 3D display device comprising the backlight module illustrated in FIG. 4a;

FIG. 5a is a schematic diagram illustrating a configuration of grating sub-pixels in FIG. 4a;

FIG. 5b is a control signal timing diagram of the backlight module illustrated in FIG. 4a;

FIG. 5c is a schematic structural view of a 3D display device comprising the backlight module illustrated in FIG. 4a;

FIG. 5d is a schematic diagram illustrating another configuration of grating sub-pixels in FIG. 4a;

FIG. 6b is a control signal timing diagram of the backlight module illustrated in FIG. 6a;

FIG. 6c is a schematic structural view of a 3D display device comprising the backlight module illustrated in FIG. 6a;

FIG. 6d is a schematic diagram illustrating another configuration of grating sub-pixels in FIG. 6a;

FIG. 7b is a control signal timing diagram of the backlight module illustrated in FIG. 7a;

FIG. 7c is a schematic structural view of a 3D display device comprising the backlight module illustrated in FIG. 7a;

FIG. 7d is a schematic diagram illustrating another configuration of grating sub-pixels in FIG. 7a;

Figure 1A:
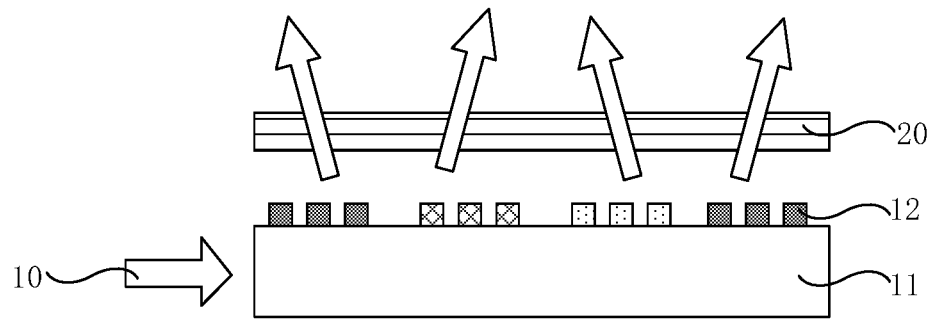
FIG. 1a is a schematic structural view of a 3D display device.

Reference numerals of the accompanying drawings:
01—backlight module; 10—light source; 101—first light source; 102—second light source; 103—third light source; 104—fourth light source; 105—fifth light source; 106—sixth light source; 11—LGP (light guide plate);

12—grating sub-pixel; 121—first grating sub-pixel; 122—second grating sub-pixel; 123—third grating sub-pixel; 124—fourth grating sub-pixel; 125—fifth grating sub-pixel; 126—sixth grating sub-pixel; 13—grating pixel; 20—LCD panel; 30—control module; 200—light-adjusting pixel; 210—light-adjusting sub-pixel; 200'—pixel unit; 121'—red grating sub-pixel; 122'—green grating sub-pixel; 123'—blue grating sub-pixel.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship can be changed accordingly.

As illustrated in FIG. 1a, a grating-type 3D display device comprises: a collimated light source 10, an LGP (light guide plate) 11, a grating sub-pixel 12 and an LCD (liquid crystal display) panel 20. Light emitted by the collimated light source 10 is incident on a surface of the grating sub-pixel 12 after transmitting through the LGP 11. By adoption of a plurality of grating sub-pixels 12 with different periods (i.e., grating periods) and different orientation angles, the light can be emitted along a plurality of viewing angles (emergent light along 4 different directions is exemplarily illustrated in FIG. 1). Thus, a left eye and a right eye of users at different viewing positions can respectively receive light with different viewing angles.

Figure 1B:
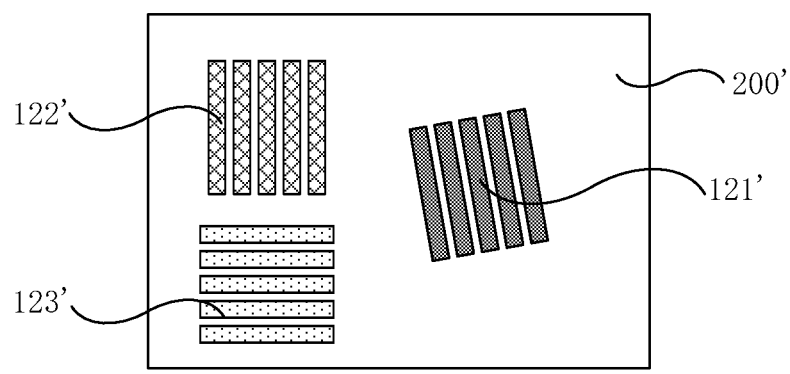

For instance, in the above 3D display device, as illustrated in FIG. 1b, one pixel unit 200' in the LCD panel 20 corresponds to three grating sub-pixels, e.g., a red (R) grating sub-pixel 121', a green (G) grating sub-pixel 122' and a blue (B) grating sub-pixel 123'. Thus, the pixel unit 200' can only output light with one gray scale value within a time period of one frame, so the display device has a low resolution.

Figure 2:
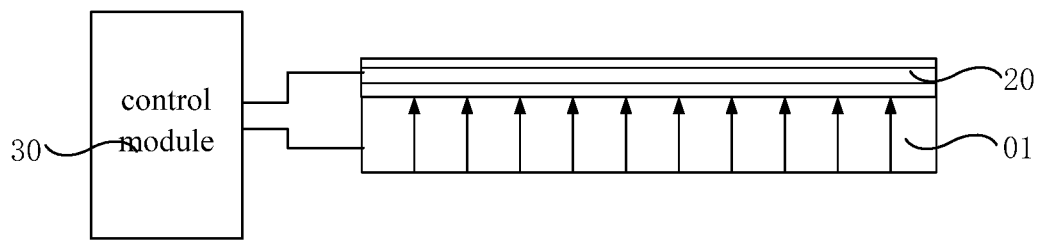
FIG. 2 is a schematic structural view of a 3D display device provided by the embodiment of the present disclosure.

The embodiment of the present disclosure provides a 3D display device, which comprises a backlight module 01, an LCD panel 20 and a control module 30 illustrated in FIG. 2. The LCD panel 20 is disposed at a light-exiting side of the backlight module 01.

Figure 3A:
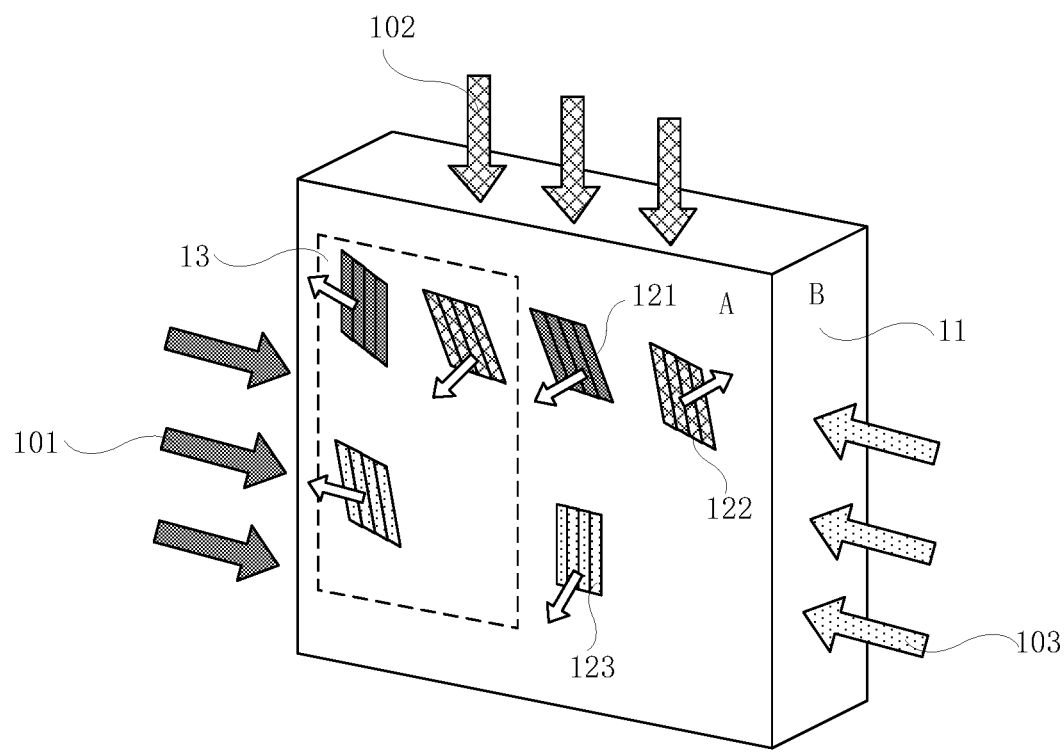
FIG. 3a is a schematic structural view of a backlight module in FIG. 2.

For instance, the backlight module 01 includes an LGP 11 and a plurality of light sources that are each disposed at a side surface B of the LGP 11 illustrated in FIG. 3a. The plurality of light sources at least include a first light source 101, a second light source 102 and a third light source 103. Colors of light emitted by the first light source 101, the second light source 102 and the light source 103 are three primary colors.

For instance, the side surfaces B of the LGP 11 refers to surfaces intersected with a surface A at a light-exiting side of the LGP 11. Each side surface B and the surface A at the light-exiting side can be perpendicular to each other or form a certain tilt angle. The present disclosure will not define the concrete configuration regarding the above content.

For instance, the plurality of light sources can be disposed at a same side surface B of the LGP 11, or as illustrated in FIG. 3a, respectively disposed at different side surfaces B. The present disclosure will not define the concrete configuration regarding the above content. For instance, in the case that the plurality of light sources are lit in sequence, all the light sources can be disposed at the same side surface B of the LGP 11, and the luminous effect of the light sources of the above configuration is the same with or almost the same with that of the case that the light sources are respectively disposed at different side surfaces B of the LGP 11. Thus, both of the above configurations are applicable. However, in the case that the light sources are lit simultaneously, for the uniform mixing of light emitted by different light sources, for instance, different light sources can be disposed at different side surfaces B. Of course, in the case that the number of the light sources is not matched with the number of the side surfaces B of the LGP 11, two different light sources can be disposed on one side surface B. Of course, the foregoing only illustrates the configuration of the light sources exemplarily. No further description will be given regarding other configurations.

For instance, the colors of the light for forming the three primary colors will not be limited by the present disclosure. The colors of the light can be red light, green light and blue light, or can be cyan (C) light, magenta (M) light and yellow (Y) light. No limitation will be given regarding the above content in the present disclosure. For the sake of convenience, descriptions will be given to the following embodiments by taking the following configuration as an example: the first light source 101 emits red light; the second light source 102 emits green light; and the third light source 103 emits blue light.

For instance, a plurality of grating pixels 13 are disposed on the surface A at the light-exiting side of the LGP 11. Each grating pixel 13 at least includes a first grating sub-pixel 121, a second grating sub-pixel 122 and a third grating sub-pixel 123 which are respectively configured to filter for transmit the light emitted by the first light source 101, the second light source 102 and the third light source 103. That is to say, the first grating sub-pixel 121 is configured to filter for transmit the light emitted by the first light source 101; the second grating sub-pixel 122 is configured to filter for transmit the light emitted by the second light source 102; and the third grating sub-pixel 123 is configured to filter for transmit the light emitted by the third light source 103.

Figure 3B:
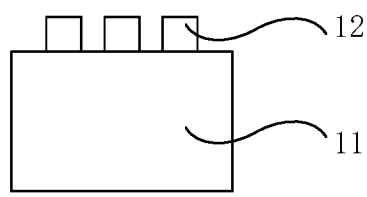
Figure 3C:
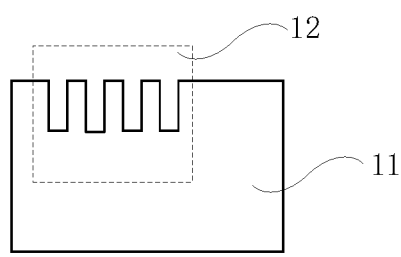

For instance, the grating sub-pixels 12 (the first grating sub-pixel 121, the second grating sub-pixel 122 and the third grating sub-pixel 123) can be made from a resin material, and, are disposed on the surface A at the light-exiting side of the LGP 11 as illustrated in FIG. 3*b*; the grating sub-pixels 12 can protrude from the surface A at the light-exiting side of the LGP 11, or as illustrated in FIG. 3*c*, a plurality of grooves can be formed on the surface A at the light-exiting side of the LGP 11 by a patterning process, e.g., an etching process, so as to form the grating sub-pixels 12. No limitation will be given regarding a manufacturing process of the grating sub-pixels 12 in the present disclosure.

Figure 3D:
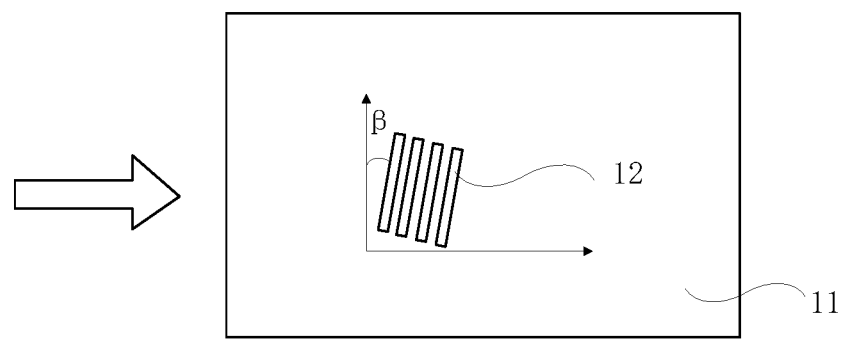

For instance, as illustrated in FIG. 3*a*, emergent light of different grating sub-pixels 12 can have different angles and wavelengths, such that displayed images can be separated and the left eye and the right eye of the user can respectively receive different images, and 3D display function can be finally achieved. An angle of the emergent light of the grating sub-pixel 12 is relevant to the period and the orientation angle β, which is illustrated in FIG. 3*d*, of the grating sub-pixel 12. The period and the orientation angle β of the grating sub-pixels 12 can be determined by a wavelength and an incidence angle of an incident light of the light sources 10, and a diffraction angle of the above light obtained after diffraction in the LGP 11. Therefore, a desired light having different viewing angle directions and different wavelengths can be obtained by forming a plurality of grating sub-pixels 12 with different orientation angles β and periods, which are designed according to demands, on the surface A at the light-exiting side of the LGP 11.

Figure 5A:
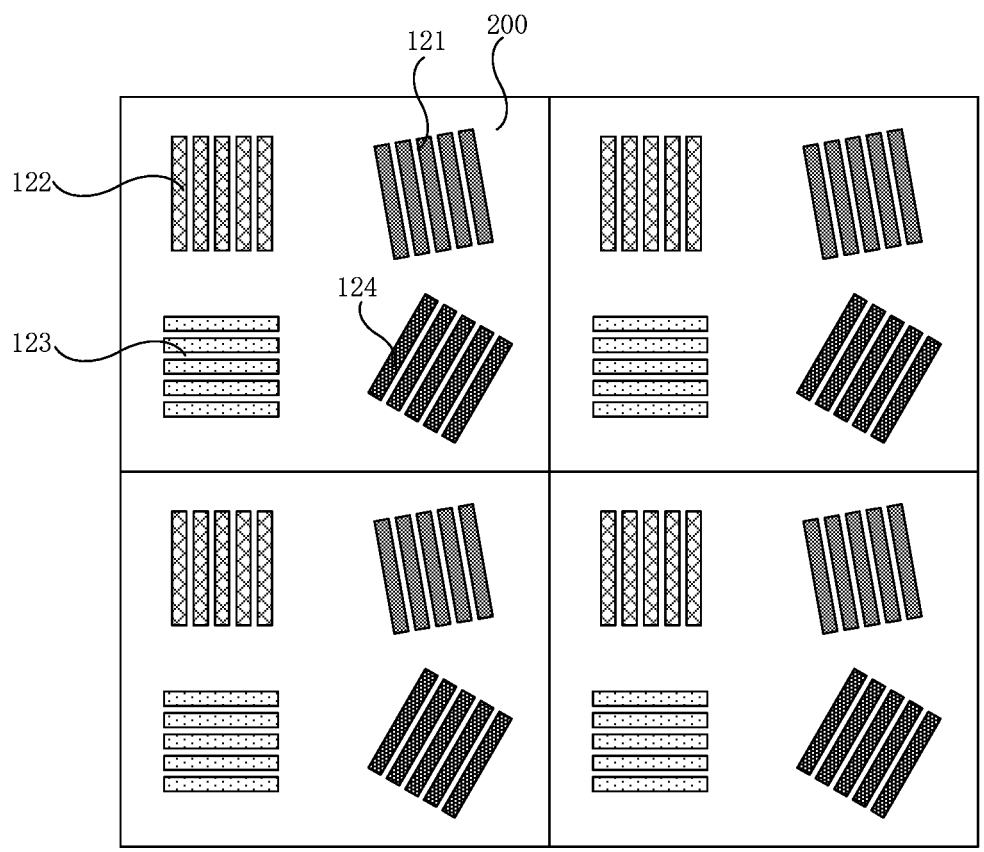

For instance, the LCD panel 20 includes a plurality of light-adjusting pixels 200. The light-adjusting pixel 200, as illustrated in FIG. 5*a*, corresponds to the grating pixel 13, which is at least comprises the first grating sub-pixel 121, the second grating sub-pixel 122 and the third grating sub-pixel 123. The description that the light-adjusting pixel 200 corresponds to the grating pixel 13 refers to that light outputted from the grating pixel 13 can be exited from the light-adjusting pixel 200 corresponding to the grating pixel 13.

Figure 3E:
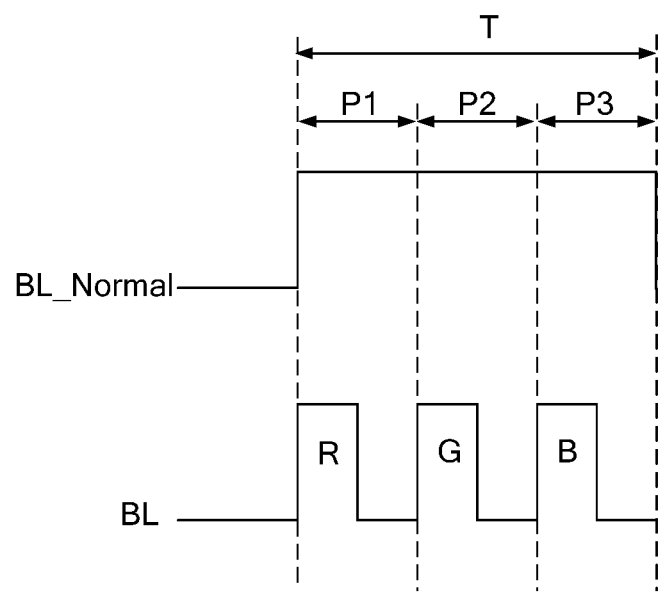

For instance, the control module 30 can be connected with the backlight module 01 and the LCD panel 20, and is configured to drive the plurality of light sources to be lit in sequence with a backlight driving signal BL within a time period of one frame T as illustrated in FIG. 3*e*, and adjust a gray scale of each light-adjusting pixel 200 in the LCD panel 20 in a time period (P1, P2 or P3) of lighting each light source. Because a backlight driving signal BL_Normal provided by a conventional display device is configured to control the light source 10 to be in enable state within the time period of one frame T (in an actual control process, in the case that BL_Normal is changed from a low signal state to a high signal state, there is a climbing stage, which is not illustrated in the figure), and the LCD panel 20 is only refreshed once within the time period of one frame T. But the backlight driving signal BL in the embodiment of the present disclosure can light up different light sources in sequence, and on this basis, the LCD panel 20 can be refreshed once during the time period of lighting each light source, such that each light-adjusting pixel 200 can be charged for at least three times, and hence the light-adjusting pixel 200 can output light with a plurality of (at least three) colors and different gray scales within the time period of one frame T. In this case, the human eye can view light obtained after the mixing of the light with at least three colors and different gray scales through one light-adjusting pixel 200 within the time period of one frame T. Therefore, images displayed by the 3D display device can be varied and exquisite, so that the resolution of the 3D display device can be improved.

The embodiment of the present disclosure provides a 3D display device, which comprises a backlight module, an LCD panel and a control module. The backlight module includes an LGP and a plurality of light sources. Light emitted by the plurality of light sources is at least partially incident into the LGP. The plurality of light sources at least include a first light source, a second light source and a third light source. Colors of light emitted by the first light source, the second light source and the third light source are three primary colors (the three primary colors are formed by the light). A plurality of grating pixels are disposed on a surface at a light-exiting side of the LGP. Each grating pixel at least includes a first grating sub-pixel, a second grating sub-pixel and a third grating sub-pixel, which are respectively configured to filter for transmit the light emitted by the first light source, the second light source and the third light source. The LCD panel includes a plurality of light-adjusting pixels. The light-adjusting pixels have a one-to-one correspondence with the grating pixels (i.e., one light-adjusting pixel corresponds to one grating pixel). The control module is connected with the backlight module and the LCD panel and configured to drive the plurality of light sources to be lit sequentially or simultaneously within a time period of one frame, and adjust a gray scale of each light-adjusting pixel in the LCD panel at a period of lighting each light source.

For instance, the plurality of light sources are disposed at side surfaces of the LGP.

For instance, the light-adjusting pixels are defined by the intersections of gate lines and data lines of the LCD panel. In this case, the plurality of light sources can be driven to be lit in sequence with the control module within the time period of one frame; in the process of lighting each light source, the gate lines of the LCD panel are driven to perform progressive scanning, so as to switch on the light-adjusting pixels line by line, and hence the enabled light-adjusting pixels can be charged by the data lines, and the objective of adjusting the gray scale of the light-adjusting pixels can be finally achieved. Because the 3D display device at least comprises three light sources, one light-adjusting pixel can be charged for at least three times within the time period of one frame, such that three gray scales can be modulated.

For instance, because one light-adjusting pixel can correspond to one grating pixel formed by at least three grating sub-pixels, the light-adjusting pixel can output at least three kinds of monochromatic light with different gray scales within the time period of one frame, and the human eye can view mixed light of the at least three kinds of monochromatic light within the time period of one frame.

For instance, because one light-adjusting pixel of the above 3D display device can display at least three kinds of monochromatic light with different gray scales within the time period of one frame, the 3D display device has a high resolution and the image quality of display images is also improved.

For instance, in the case that the number of light sources comprised by the 3D display device is different, the internal structure thereof can also be changed. Detailed description will be given below with reference to, for instance, the embodiments.

First Embodiment

Figure 4A:
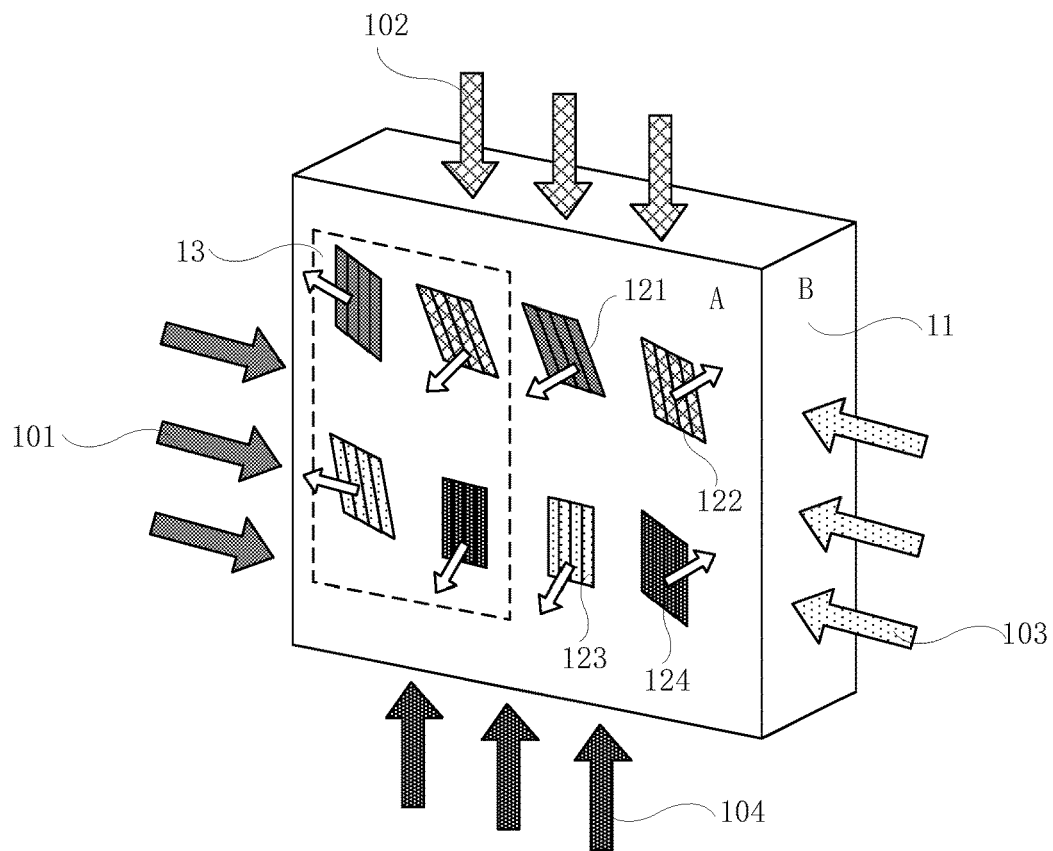
FIG. 4a is a schematic structural view of a backlight module including four light sources provided by the embodiment of the present disclosure.

In the embodiment, the plurality of light sources 10 includes a first light source 101, a second light source 102, a third light source 103 and a fourth light source 104 as illustrated in FIG. 4*a*. The fourth light source 104 can emit any one of cyan light, magenta light and yellow light. In this case, the cross section of the LGP 11 is a quadrangle (e.g., a rectangle, a square, a diamond, and the like). The first light source 101, the second light source 102, the third light source 103 and the fourth light source 104 are respectively disposed at four side surfaces of the LGP 11.

For instance, the cross section of the LGP 11 refers to a cross section obtained by the sectioning of the LGP 11 along a direction parallel to the surface at a light-exiting side of the LGP 11.

For instance, description is given in the embodiment by taking the following configuration as an example: the first light source 101 emits red light; the second light source 102 emits green light; the third light source 103 emits blue light; and the fourth light source 104 emits cyan light.

Figure 4B:
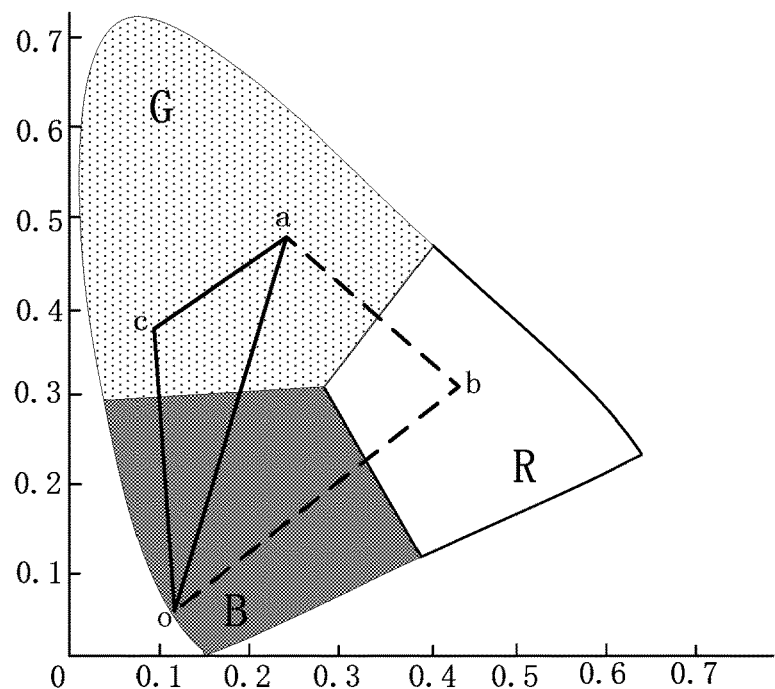

For instance, because four light sources are provided in the embodiment, a color gamut is increased compared with a color gamut of the display device with the three primary colors. For instance, as illustrated in FIG. 4b, the color gamut of the display device with the three primary colors is an area of a triangle oab encircled by dotted lines. In the case that the number of the light sources in the backlight module is increased, for instance, the fourth light source 104 is added, a triangle oac encircled by solid lines is added into the color gamut of the display device, and the color gamut of the display device is increased from the original triangle oab to a quadrangle oabc. Thus, the color gamut can be increased and the displayed images can be more vivid.

On this basis, as illustrated in FIG. 5a, one light-adjusting pixel 200 corresponds to one grating pixel 13 formed by a first grating sub-pixel 121, a second grating sub-pixel 122, a third grating sub-pixel 123 and a fourth grating sub-pixel 124.

Figure 5B:
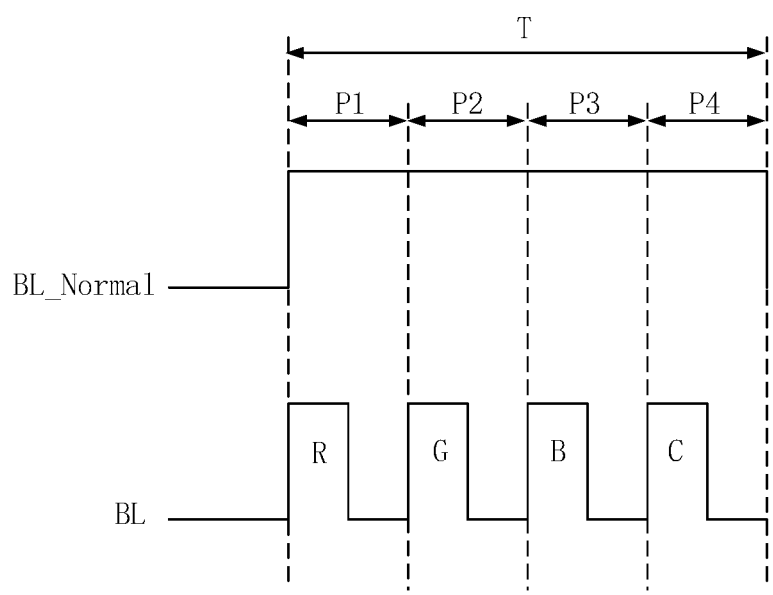
Figure 5C:
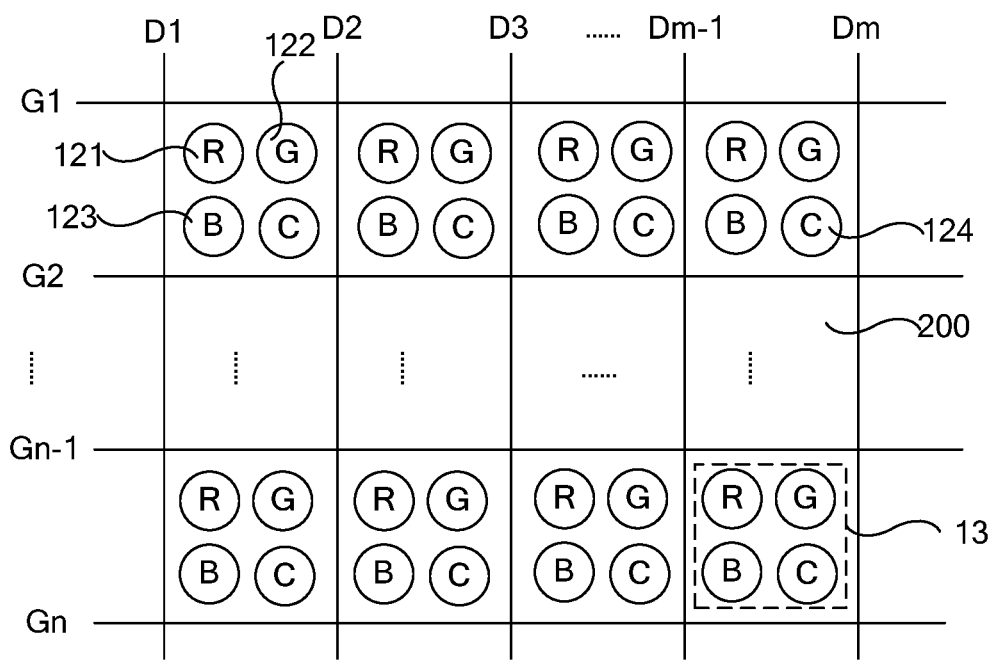

For instance, as illustrated in FIG. 5b, the first light source 101, the second light source 102, the third light source 103 and the fourth light source 104 can be lit in sequence within the time period of one frame T; and in the process of lighting each light source, the LCD panel 20 is refreshed once, for instance, the refreshing process is that the gate lines (G1, G2 . . . Gn) as illustrated in FIG. 5c of the LCD panel 20 can be subjected to progressive scanning, so as to switch on the light-adjusting pixels line by line, and hence the enabled (i.e., on-state) light-adjusting pixels 200 can be charged by the data lines (D1, D2, D3 . . . Dm), and the gray scale of the light-adjusting pixels 200 can be finally adjusted, in which n and m are a positive integer greater than or equal to 2. In addition, the grating sub-pixels 12 in FIG. 5c are simplified and represented by circles, and letters in the circles represent the colors of light capable of being filtered out.

For instance, firstly, at the first time period P1 of the time period of one frame T, the backlight driving signal BL inputs red light (R) driving signal, and the first light source 101 as illustrated in FIG. 3a is lit and emits red light (R).

For instance, the gate lines (G1, G2 . . . Gn) as illustrated in FIG. 5c of the LCD panel 20 are subjected to progressive scanning, so as to switch on the light-adjusting pixels 200 line by line; the data lines (D1, D2, D3 . . . Dm) charge the on-state light-adjusting pixels 200; and the red light emitted by the first light source 101 transmits through the first grating sub-pixels 121 and incidents on the light-adjusting pixels 200 corresponding to the first grating sub-pixels 121. Thus, the objective of adjusting the gray scale of the red light outputted by the light-adjusting pixels 200 at the first time period P1 can be achieved by the control of the charge amount of the light-adjusting pixels 200.

For instance, at the second time period P2 of the time period of one frame T, the backlight driving signal BL inputs green light (G) driving signal, and the second light source 102 as illustrated in FIG. 3a is lit and emits green light.

For instance, the gate lines (G1, G2 . . . Gn) of the LCD panel 20 are subjected to progressive scanning; the data lines (D1, D2, D3 . . . Dm) charge the on-state light-adjusting pixels 200; and the green light emitted by the second light source 122 transmits through the second grating sub-pixels 121 and incidents on the light-adjusting pixels 200 corresponding to the second grating sub-pixels 122. Thus, the objective of adjusting the gray scale of the green light outputted by the light-adjusting pixels 200 at the second time period P2 can be achieved by the control of the charge amount of the light-adjusting pixels 200.

For instance, at the third time period P3 of the time period of one frame T, the backlight driving signal BL inputs blue light (B) driving signal, and the third light source 103 as illustrated in FIG. 3a is lit and emits blue light.

For instance, the gate lines (G1, G2 . . . Gn) of the LCD panel 20 are subjected to progressive scanning; the data lines (D1, D2, D3 . . . Dm) charge the light-adjusting pixels 200; and the light emitted by the third light source 103 transmits through the third grating sub-pixels 123 and incidents on the light-adjusting pixels 200 corresponding to the third grating sub-pixels 123. Thus, the objective of adjusting the gray scale of the blue light outputted by the light-adjusting pixels 200 at the third time period P3 can be achieved by the control of the charge amount of the light-adjusting pixels 200.

For instance, at the fourth time period P4 of the time period of one frame T, the backlight driving signal BL inputs cyan light (C) driving signal, and the fourth light source 104 as illustrated in FIG. 3a is lit and emits cyan light.

For instance, the gate lines (G1, G2 . . . Gn) of the LCD panel 20 are subjected to progressive scanning; the data lines (D1, D2, D3 . . . Dm) charge the light-adjusting pixels 200; and the cyan light emitted by the fourth light source 104 transmits through the fourth grating sub-pixels 124 and incidents on the light-adjusting pixels 200 corresponding to the fourth grating sub-pixels 124. Thus, the objective of adjusting the gray scale of the cyan light outputted by the light-adjusting pixels 200 at the fourth time period P4 can be achieved by the control of the charge amount of the light-adjusting pixels 200.

In summary, as illustrated in FIG. 5b, the conventional backlight driving signal BL_Normal is in enable (i.e., valid) state within the time period of one frame T. But the backlight driving signal BL in the embodiment of the present disclosure can light up different light sources in sequence, and on this basis, the LCD panel 20 can be refreshed for four times, such that each light-adjusting pixel 200 can be charged for four times, and hence the light-adjusting pixel 200 can output light with four colors and different gray scales (e.g. four) within the time period of one frame T. In this case, the human eye can view light obtained after the mixing of the light with four colors and different gray scales through one light-adjusting pixel 200 within the time period of one frame T. Therefore, images displayed by the 3D display device can be varied and exquisite, so that the resolution of the 3D display device can be improved.

On this basis, in order to make a refreshing frequency of the LCD panel 20 within one frame of time T homogenous, for instance, the first time period P1, the second time period P2, the third time period P3 and the fourth time period P4 respectively occupy ¼ of the time period of one frame T.

For instance, although the 3D display device with the above structure has a high resolution, the LCD panel 20 is refreshed for 4 times, so the requirement on the response speed of the LCD panel 20 can be high. In order to solve the above problem, each light-adjusting pixel 200 can include a plurality of light-adjusting sub-pixels 210, and the light-adjusting sub-pixels have a one-to-one correspondence with the grating sub-pixels (i.e., one light-adjusting sub-pixel 210 corresponds to one grating sub-pixel 12).

Figure 5D:
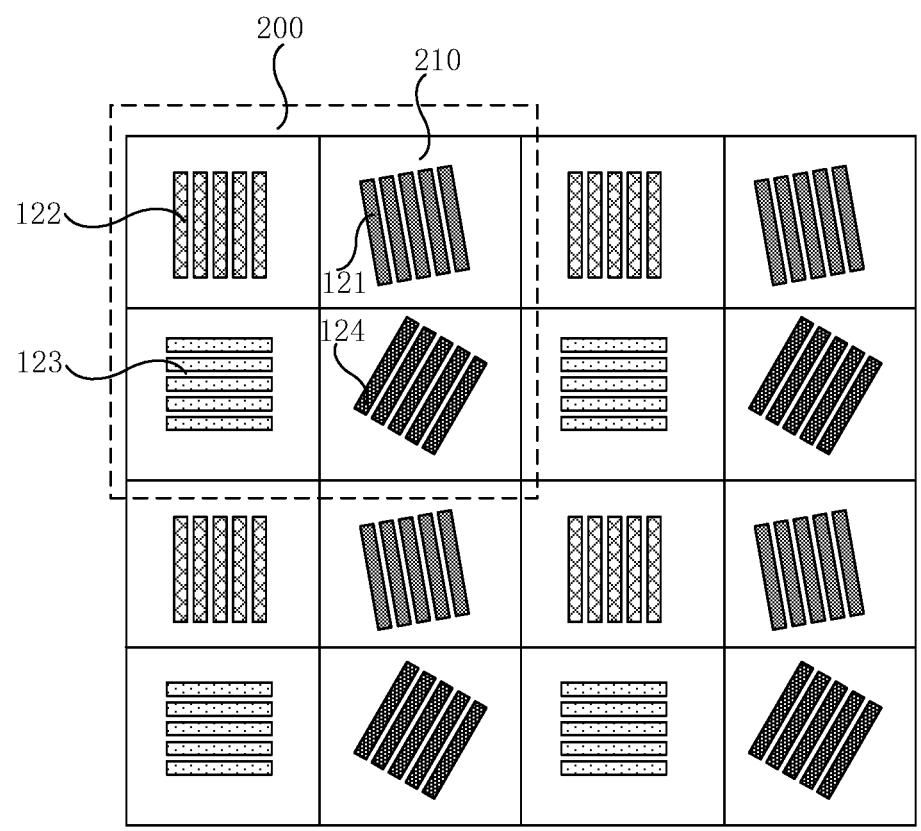

For instance, as illustrated in FIG. 5*d*, the light-adjusting pixel 200 includes four light-adjusting sub-pixels 210. The first grating sub-pixel 121, the second grating sub-pixel 122, the third grating sub-pixel 123 and the fourth grating sub-pixel 124 in one grating pixel 13 respectively correspond to one light-adjusting sub-pixel 210.

For instance, because each light-adjusting sub-pixel 210 is connected with one gate line and one data line which are intersected with each other, the LCD panel 20 can be refreshed once within the time period of one frame; all the gate lines are subjected to progressive scanning, so as to switch on all the light-adjusting sub-pixels 210 line by line; and the data lines can charge the light-adjusting sub-pixels 210 connected with the data lines so as to control the gray scale of the light-adjusting sub-pixels 210, so as to make different light-adjusting sub-pixels 210 have different gray scales. On this basis, the backlight module can adopt a backlight driving signal BL_Normal as illustrated in FIG. 5*b*, so that the first light source 101, the second light source 102, the third light source 103 and the fourth light source 104 can be lit simultaneously within the time period of one frame T. Thus, the light-adjusting sub-pixel 210 corresponding to the first grating sub-pixel 121 outputs red light; the light-adjusting sub-pixel 210 corresponding to the second grating sub-pixel 122 outputs green light; the light-adjusting sub-pixel 210 corresponding to the third grating sub-pixel 123 outputs blue light; and the light-adjusting sub-pixel 210 corresponding to the fourth grating sub-pixel 124 outputs cyan light. Because the above four light-adjusting sub-pixels 210 have different gray scales, the human eye can view light obtained after the mixing of the light with four colors and different gray scales outputted by the above four light-adjusting sub-pixels 210 within the time period of one frame T. Therefore, images displayed by the 3D display device can be varied and exquisite, so that the resolution of the 3D display device can be improved.

Second Embodiment

The embodiment is similar to the first embodiment and the light sources 10 comprises a first light source 101, a second light source 102, a third light source 103 and a fourth light source 104, and each grating pixel 13 includes a first grating sub-pixel 121, a second grating sub-pixel 122, a third grating sub-pixel 123 and a fourth grating sub-pixel 124. The differences are that: the above light sources 10, as illustrated in FIG. 6*a*, further includes a fifth light source 105; the grating pixel 13, as illustrated in FIG. 6*c*, further includes a fifth grating sub-pixel 125; and the fifth grating sub-pixel 125 is configured to filter for transmit light emitted by the fifth light source 105.

For instance, on the basis that the fourth light source 104 emits cyan light, the fifth light source 105 can emits magenta light or yellow light. Description is given in the embodiment by taking the case that the fifth light source 105 emits magenta light as an example.

Figure 6A:
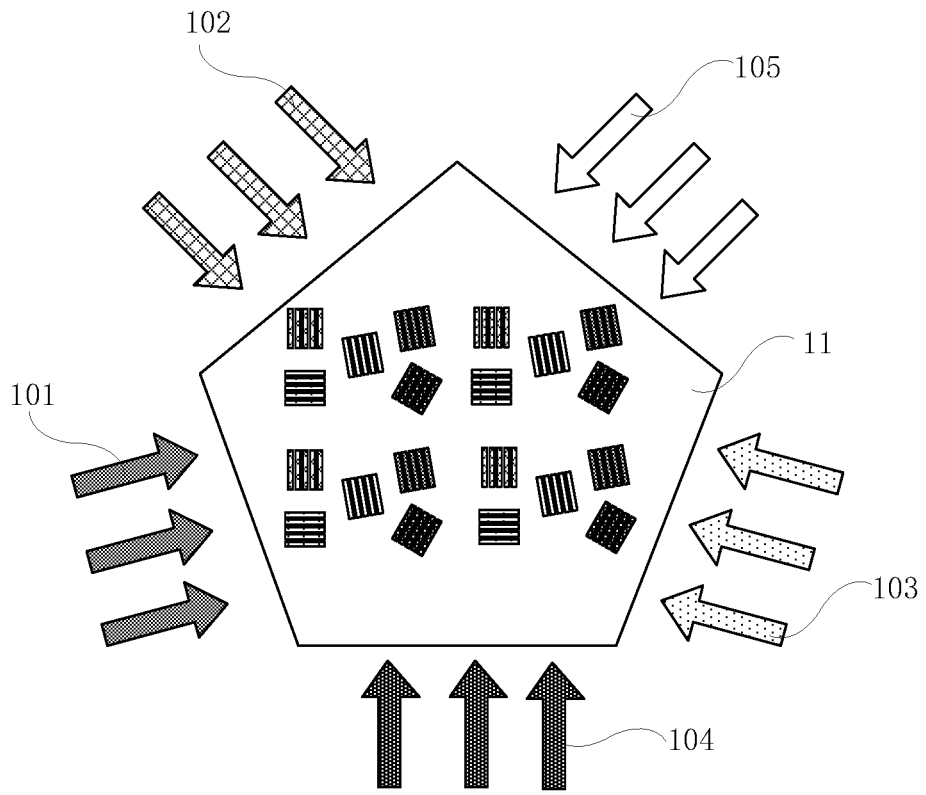
FIG. 6a is a schematic structural view of a backlight module including five light sources provided by the embodiment of the present disclosure.

For instance, the cross section of the LGP 11 is a pentagon as illustrated in FIG. 6*a*. In order to obtain orderly structural layout, the cross section of the LGP 11, for instance, can be a regular pentagon. In this case, the first light source 101, the second light source 102, the third light source 103, the fourth light source 104 and the fifth light source 105 are respectively disposed at five side surfaces of the LGP 11.

Figure 6B:
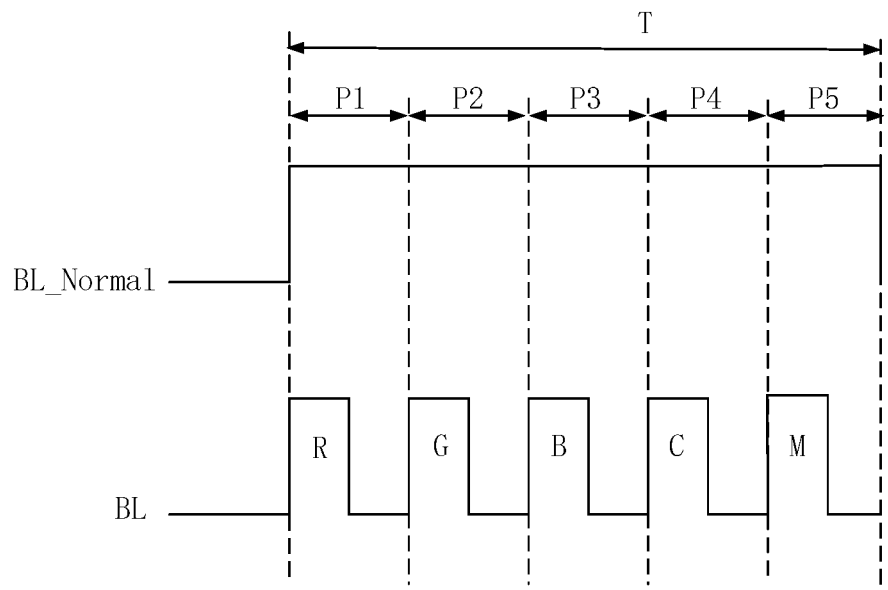
Figure 6C:
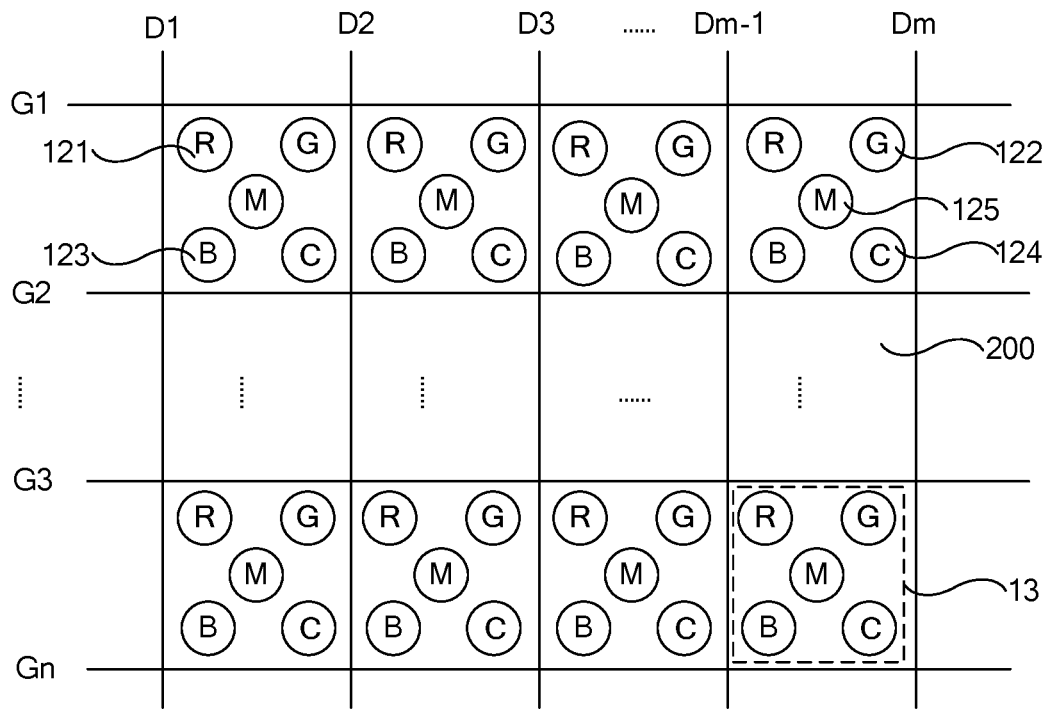

For instance, as illustrated in FIG. 6*b*, the first light source 101, the second light source 102, the third light source 103, the fourth light source 104 and the fifth light source 105 can be lit in sequence within the time period of one frame T; and in the process of lighting each light source, the LCD panel 20 is refreshed once, and the refreshing process is that the gate lines (G1, G2 . . . Gn) as illustrated in FIG. 6*c* of the LCD panel 20 can be subjected to progressive scanning, so as to switch on the light-adjusting pixels 200 line by line, and hence the data lines (D1, D2, D3 . . . Dm) can charge the on-state light-adjusting pixels 200, so as to achieve the objective of adjusting the gray scale of the light-adjusting pixels 200 within the time period of one frame T.

For instance, the first light source 101, the second light source 102, the third light source 103 and the fourth light source 104 are lit in sequence; and in the process of lighting each light source, the refreshing process of the LCD panel 20 is the same with that of the first embodiment. But after the LCD panel 20 being refreshed for four times, at the fifth time period P5 of the time period of one frame T, the backlight driving signal BL inputs magenta light driving signal, and the fifth light source 105 as illustrated in FIG. 6*a* is lit and emits magenta light. Meanwhile, the LCD panel 20 is refreshed once, and the objective of adjusting the gray scale of the magenta light outputted by the light-adjusting pixels 200 at the fifth time period P5 can be achieved.

For instance, in order to make a refreshing frequency of the LCD panel 20 within the time period of one frame T homogenous, for instance, the first time period P1, the second time period P2, the third time period P3, the fourth time period P4 and the fifth time period P5 respectively occupy ⅕ of the time period of one frame T.

Figure 6D:
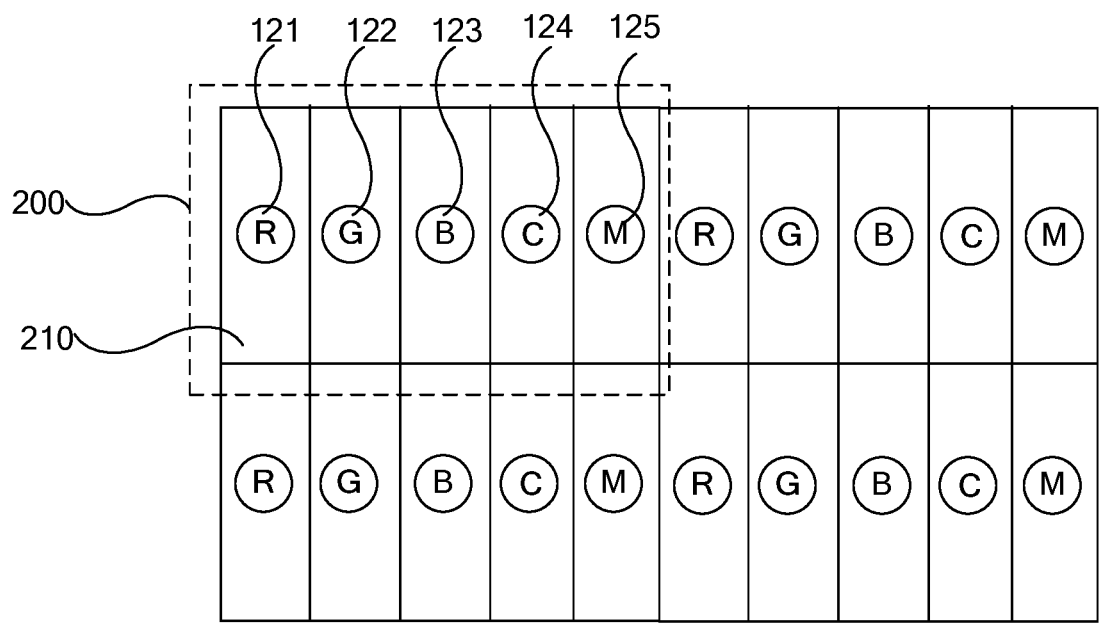

For instance, the 3D display device with the above structure also has high requirement on the response speed of the LCD panel 20. Thus, for instance, as illustrated in FIG. 6*d*, the light-adjusting pixel 200 can include five light-adjusting sub-pixels 210. The first grating sub-pixel 121, the second grating sub-pixel 122, the third grating sub-pixel 123, the fourth grating sub-pixel 124 and the fifth grating sub-pixel 125 in one grating pixel 13 respectively correspond to one light-adjusting sub-pixel 210.

For instance, because each light-adjusting sub-pixel 210 is connected with one gate line and one data line which are intersected with each other, the LCD panel 20 can be refreshed once within the time period of one frame, and all the gate lines are subjected to progressive scanning to control the gray scale of the light-adjusting sub-pixels 210, so that different light-adjusting sub-pixels 210 can have different gray scales. On this basis, the backlight module can adopt a backlight driving signal BL Normal as illustrated in FIG. 6*b*, so that the first light source 101, the second light source 102, the third light source 103, the fourth light source 104 and the fifth light source 105 can be lit simultaneously within the time period of one frame T. Thus, the light-adjusting sub-pixel 210 corresponding to the first grating sub-pixel 121 outputs red light; the light-adjusting sub-pixel 210 corresponding to the second grating sub-pixel 122 outputs green light; the light-adjusting sub-pixel 210 corresponding to the third grating sub-pixel 123 outputs blue light; the light-adjusting sub-pixel 210 corresponding to the fourth grating sub-pixel 124 outputs cyan light; and the light-adjusting sub-pixel 210 corresponding to the fifth grating sub-pixel 125 outputs magenta light. Because the above five light-adjusting sub-pixels 210 have different gray scales, the human eye can view light obtained after the mixing of the light with five colors and different gray scales outputted by the above five light-adjusting sub-pixels 210 within the time period of one frame T. Therefore, images displayed by the 3D display device can be varied and exquisite, so that the resolution of the 3D display device can be improved.

Third Embodiment

The embodiment is similar to the second embodiment and the light sources 10 comprises a first light source 101, a second light source 102, a third light source 103, a fourth light source 104 and a fifth light source 105, and each grating pixel 13 includes a first grating sub-pixel 121, a second grating sub-pixel 122, a third grating sub-pixel 123, a fourth grating sub-pixel 124 and a fifth grating sub-pixel 125. The differences are that: the above light sources 10, as illustrated in FIG. 7a, further includes a sixth light source 106; the grating pixel 13, as illustrated in FIG. 7c, further includes a sixth grating sub-pixel 126; and the sixth grating sub-pixel 126 is configured to filter for transmit light emitted by the sixth light source 106.

For instance, the sixth light source 106 emits yellow light on the basis that the fourth light source 104 emits cyan light and the fifth light source 105 emits magenta light.

Figure 7A:
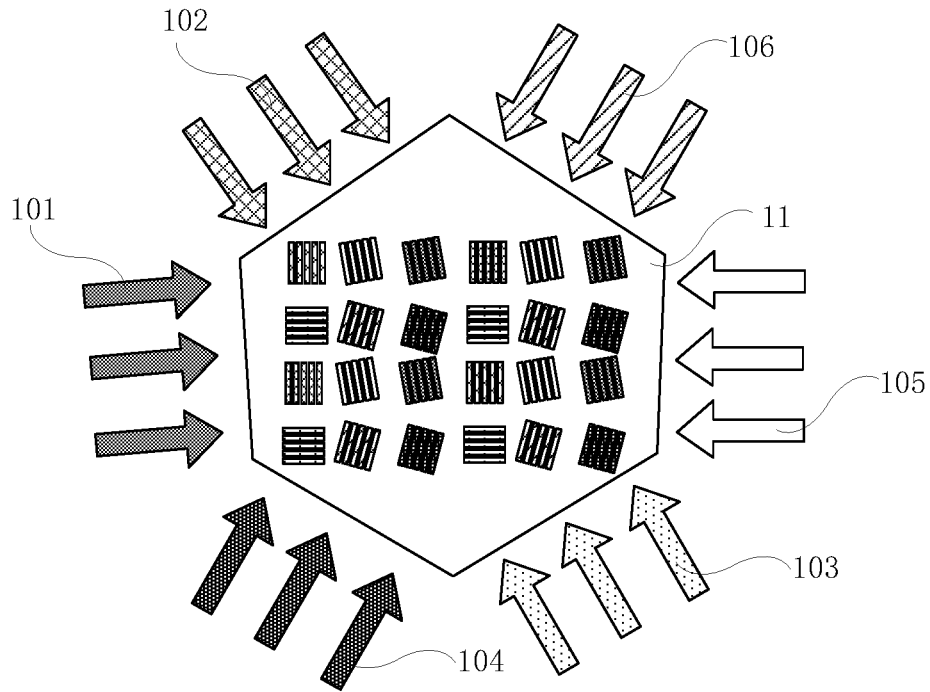
FIG. 7a is a schematic structural view of a backlight module including six light sources provided by the embodiment of the present disclosure.

For instance, the cross section of the LGP 11 is a hexagon as illustrated in FIG. 7a, in order to obtain orderly structural layout, the cross section of the LGP 11, for instance, can be a regular hexagon. In this case, the first light source 101, the second light source 102, the third light source 103, the fourth light source 104, the fifth light source 105 and the sixth light source 106 are respectively disposed at six side surfaces of the LGP 11.

Figure 7B:
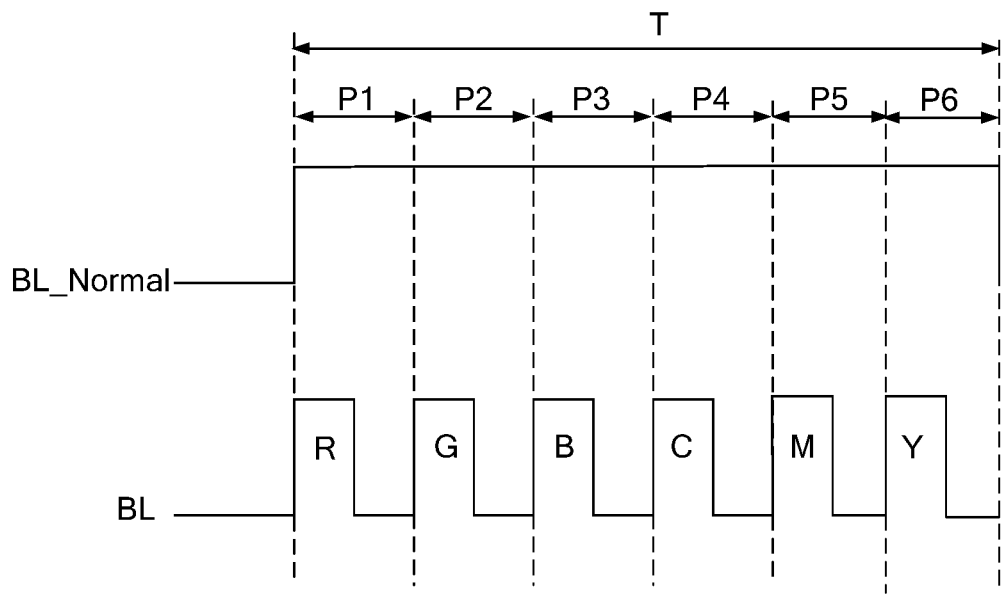
Figure 7C:
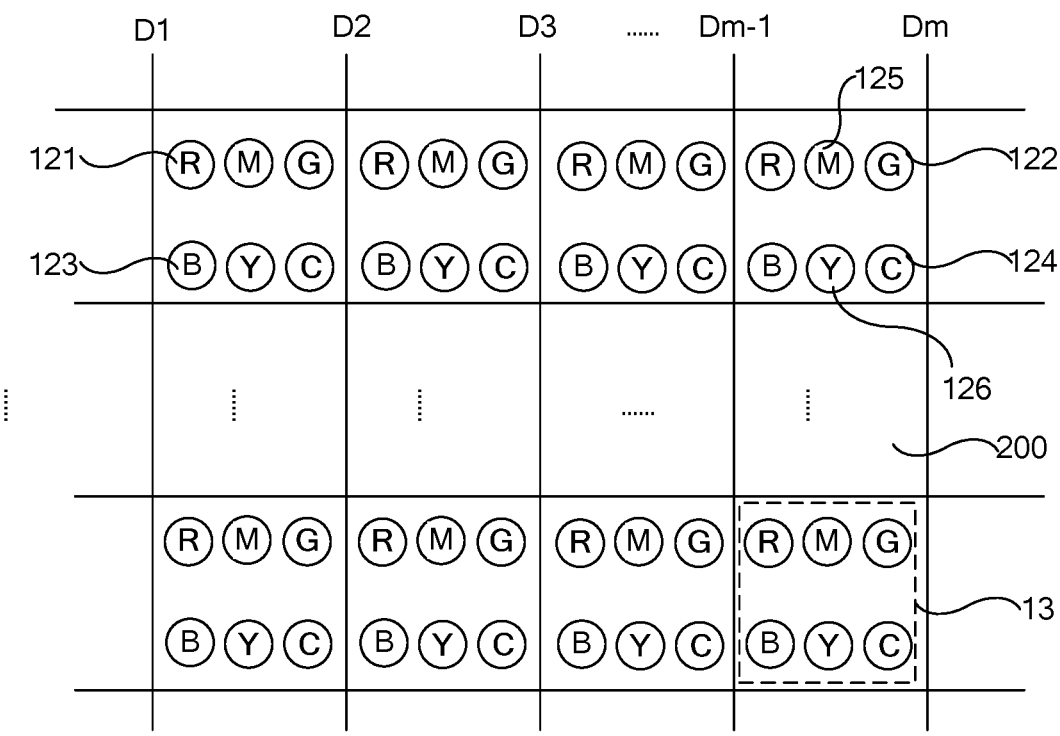

For instance, as illustrated in FIG. 7b, the first light source 101, the second light source 102, the third light source 103, the fourth light source 104, the fifth light source 105 and the sixth light source 106 can be lit in sequence within the time period of one frame T; and in the process of lighting each light source, the LCD panel 20 is refreshed once, and the specific refreshing process is that the gate lines (G1, G2 . . . Gn) as illustrated in FIG. 6c of the LCD panel 20 can be subjected to progressive scanning, so as to switch on the light-adjusting pixels 200 line by line, and hence the data lines (D1, D2, D3 . . . Dm) can charge the on-state light-adjusting pixels 200, so as to achieve the objective of adjusting the gray scale of the light-adjusting pixels 200 within the time period of one frame T.

For instance, the first light source 101, the second light source 102, the third light source 103, the fourth light source 104 and the fifth light source 105 are lit in sequence; and in the process of lighting each light source, the refreshing process of the LCD panel 20 is the same with that of the second embodiment. But after the LCD panel 20 being refreshed for fifth times, at the sixth time period P6 of the time period of one frame T, the backlight driving signal BL inputs yellow light driving signal, and the sixth light source 106 as illustrated in FIG. 7a is lit and emits yellow light. Meanwhile, the LCD panel 20 is refreshed once, and the objective of adjusting the gray scale of the yellow light outputted by the light-adjusting pixels 200 at the sixth time period P6 can be achieved.

For instance, in order to make a refreshing frequency of the LCD panel 20 within the time period of one frame T homogenous, for instance, the first time period P1, the second time period P2, the third time period P3, the fourth time period P4, the fifth time period P5 and the sixth time period P6 respectively occupy ⅙ of the time period of one frame T.

Figure 7D:
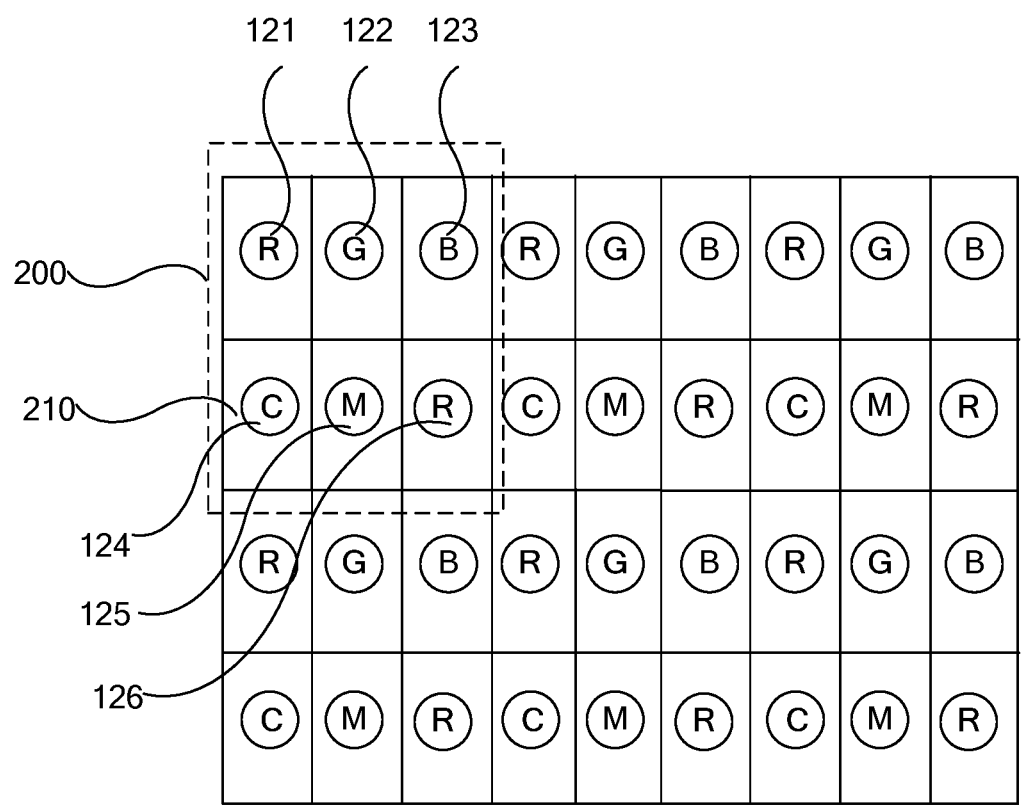

For instance, the 3D display device with the above structure also has high requirement on the response speed of the LCD panel 20. Thus, for instance, as illustrated in FIG. 7d, the light-adjusting pixel 200 can include six light-adjusting sub-pixels 210. The first grating sub-pixel 121, the second grating sub-pixel 122, the third grating sub-pixel 123, the fourth grating sub-pixel 124, the fifth grating sub-pixel 125 and the sixth grating sub-pixel 126 in one grating pixel 13 respectively correspond to one light-adjusting pixel 210.

For instance, because each light-adjusting sub-pixel 210 is connected with one gate line and one data line which are intersected with each other, the LCD panel 20 can be refreshed once within the time period of one frame, and all the gate lines are subjected to progressive scanning to control the gray scale of the light-adjusting sub-pixels 210, so that different light-adjusting sub-pixels 210 can have different gray scales. On this basis, the backlight module can adopt a backlight driving signal BL_Normal as illustrated in FIG. 7b, so that the first light source 101, the second light source 102, the third light source 103, the fourth light source 104, the fifth light source 105 and the sixth light source 106 can be lit simultaneously within the time period of one frame T. Thus, the light-adjusting sub-pixel 210 corresponding to the first grating sub-pixel 121 outputs red light; the light-adjusting sub-pixel 210 corresponding to the second grating sub-pixel 122 outputs green light; the light-adjusting sub-pixel 210 corresponding to the third grating sub-pixel 123 outputs blue light; the light-adjusting sub-pixel 210 corresponding to the fourth grating sub-pixel 124 outputs cyan light; the light-adjusting sub-pixel 210 corresponding to the fifth grating sub-pixel 125 outputs magenta light; and the light-adjusting sub-pixel 210 corresponding to the sixth grating sub-pixel 126 outputs yellow light. Because the above six light-adjusting sub-pixels 210 have different gray scales, the human eye can view light obtained after the mixing of the light with six colors and different gray scales outputted by the above six light-adjusting sub-pixels 210. Therefore, images displayed by the 3D display device can be varied and exquisite, so that the resolution of the 3D display device can be improved.

For instance, compared with the backlight module with the three primary colors in the prior art, in the first embodiment, the second embodiment and the third embodiment, at least one light source is added in the backlight module of the 3D display device, such that the triangle oab in FIG. 4b can be converted into a polygon (at least a quadrangle). Thus, the color gamut of the display device can be increased, and hence the display effect can be improved.

Figure 8:
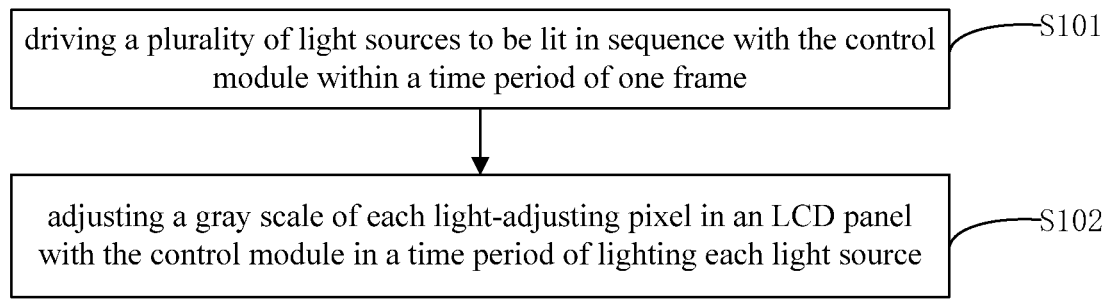
FIG. 8 is a schematic diagram illustrating a driving method of the 3D display device provided by the embodiment of the present disclosure.

The embodiment of the present disclosure provides a method for driving the above 3D display device. As illustrated in FIG. 8, the driving method comprises:

S101: driving a plurality of light sources 10 to be lit in sequence with the control module 30 within a time period of one frame T.

S102: adjusting a gray scale of each light-adjusting pixel 200 in an LCD panel 20 with the control module 30 in a time period of lighting each light source 10.

For instance, the plurality of light sources can be driven to be lit in sequence with the control module within the time period of one frame; in the process of lighting each light source, the gate lines of the LCD panel are driven to perform progressive scanning, so as to switch on the light-adjusting pixels line by line, and hence the data line can charge the on-state light-adjusting pixels, and the objective of adjusting the gray scale of the light-adjusting pixels can be finally achieved. Because the 3D display device at least comprises three light sources, one light-adjusting pixel can be charged for at least three times within the time period of one frame, such that three gray scales can be modulated.

For instance, because one light-adjusting pixel can correspond to one grating pixel formed by at least three grating sub-pixels, the light-adjusting pixel can output at least three kinds of monochromatic light with different gray scales within the time period of one frame, and the human eye can view mixed light of the at least three kinds of monochromatic light within the time period of one frame.

For instance, because one light-adjusting pixel of the above 3D display device can display at least three kinds of monochromatic light with different gray scales within the time period of one frame, the 3D display device has a high resolution and the image quality of display images is also improved.

For instance, in the case that the number of light sources comprised by the 3D display device is different, the internal structure thereof can also be changed. Detailed description will be given below with reference to the embodiments.

Fourth Embodiment

In the embodiment, the plurality of light sources 10 includes a first light source 101, a second light source 102, a third light source 103 and a fourth light source 104 as illustrated in FIG. 4a. Each grating pixel 13 at least includes a first grating sub-pixel 121, a second grating sub-pixel 122, a third grating sub-pixel 123 and a fourth grating sub-pixel 124. In this case, the driving method comprises:

For instance, at the first time period P1 of the time period of one frame T, the backlight driving signal BL inputs red light driving signal, and the first light source 101 as illustrated in FIG. 3a is lit.

For instance, the gate lines (G1, G2 ... Gn) as illustrated in FIG. 5c of the LCD panel 20 are subjected to progressive scanning, so as to switch on the light-adjusting pixels 200 line by line; the data lines (D1, D2, D3 ... Dm) charge the on-state light-adjusting pixels 200; and the red light emitted by the first light source 101 transmits through the first grating sub-pixels 121 and incidents on the light-adjusting pixels 200 corresponding to the first grating sub-pixels 121. Thus, the objective of adjusting the gray scale of the red light outputted by the light-adjusting pixels 200 at the first time period P1 can be achieved by the control of the charge amount of the light-adjusting pixels 200.

For instance, at the second time period P2 of the time period of one frame T, the backlight driving signal BL inputs green light driving signal, and the second light source 102 as illustrated in FIG. 3a is lit and emits green light.

For instance, the gate lines (G1, G2 ... Gn) of the LCD panel 20 are subjected to progressive scanning; the data lines (D1, D2, D3 ... Dm) charge the on-state light-adjusting pixels 200; and the green light emitted by the second light source 122 transmits through the second grating sub-pixels 121 and incidents on the light-adjusting pixels 200 corresponding to the second grating sub-pixels 122. Thus, the objective of adjusting the gray scale of the green light outputted by the light-adjusting pixels 200 at the second time period P2 can be achieved by the control of the charge amount of the light-adjusting pixels 200.

For instance, at the third time period P3 of the time period of one frame T, the backlight driving signal BL inputs blue light driving signal, and the third light source 103 as illustrated in FIG. 3a is lit and emits blue light.

For instance, the gate lines (G1, G2 ... Gn) of the LCD panel 20 are subjected to progressive scanning; the data lines (D1, D2, D3 ... Dm) charge the light-adjusting pixels 200; and the light emitted by the third light source 103 transmits through the third grating sub-pixels 123 and incidents on the light-adjusting pixels 200 corresponding to the third grating sub-pixels 123. Thus, the objective of adjusting the gray scale of the blue light outputted by the light-adjusting pixels 200 at the third time period P3 can be achieved by the control of the charge amount of the light-adjusting pixels 200.

For instance, at the fourth time period P4 of the time period of one frame T, the backlight driving signal BL inputs cyan light driving signal, and the fourth light source 104 as illustrated in FIG. 3a is lit and emits cyan light.

For instance, the gate lines (G1, G2 ... Gn) of the LCD panel 20 are subjected to progressive scanning; the data lines (D1, D2, D3 ... Dm) charge the light-adjusting pixels 200; and the cyan light emitted by the fourth light source 104 transmits through the fourth grating sub-pixels 124 and incidents on the light-adjusting pixels 200 corresponding to the fourth grating sub-pixels 124. Thus, the objective of adjusting the gray scale of the cyan light outputted by the light-adjusting pixels 200 at the fourth time period P4 can be achieved by the control of the charge amount of the light-adjusting pixels 200.

For instance, as illustrated in FIG. 5b, the conventional backlight driving signal BL_Normal is in enable state within the time period of one frame T. But the backlight driving signal BL in the embodiment of the present disclosure can light up different light sources in sequence, and on this basis, the LCD panel 20 can be refreshed for four times, such that each light-adjusting pixel 200 can be charged for at least four times, and hence the light-adjusting pixel 200 can output light with four colors and different gray scales (at least four) within the time period of one frame T. In this case, the human eye can view light obtained after the mixing of the light with four colors and different gray scales through one light-adjusting pixel 200 within the time period of one frame T. Therefore, images displayed by the 3D display device can be varied and exquisite, so that the resolution of the 3D display device can be improved.

For instance, in order to make a refreshing frequency of the LCD panel 20 within the time period of one frame T homogenous, for instance, the first time period P1, the second time period P2, the third time period P3 and the fourth time period P4 respectively occupy ¼ of the time period of one frame T.

Fifth Embodiment

The embodiment is similar to the first embodiment and the light sources 10 comprises a first light source 101, a second light source 102, a third light source 103 and a fourth light source 104, and each grating pixel 13 includes a first grating sub-pixel 121, a second grating sub-pixel 122, a third grating sub-pixel 123 and a fourth grating sub-pixel 124. The differences are that: the above light sources 10, as illustrated in FIG. 6a, further includes a fifth light source 105, and the fifth light source 105 can emit magenta light or yellow light. Description is given in the embodiment by taking the case that the fifth light source 105 emits magenta light as an example. the grating pixel 13, as illustrated in FIG. 6c, further includes a fifth grating sub-pixel 125, and the fifth grating sub-pixel 125 is configured to filter for transmit light emitted by the fifth light source 105. In this case, the driving method further comprises:

At the fifth time period P5 of the time period of one frame T, the backlight driving signal BL inputs magenta light driving signal, and the fifth light source 105 as illustrated in FIG. 6a is lit and emits magenta light. Meanwhile, the LCD panel 20 is refreshed once, and the objective of adjusting the gray scale of the magenta light outputted by the light-adjusting pixels 200 at the fifth time period P5 can be achieved.

For instance, in order to make a refreshing frequency of the LCD panel 20 within the time period of one frame T homogenous, for instance, the first time period P1, the second time period P2, the third time period P3, the fourth time period P4 and the fifth time period P5 respectively occupy ⅕ of the time period of one frame T.

Sixth Embodiment

The embodiment is similar to the second embodiment and the light sources 10 comprises a first light source 101, a second light source 102, a third light source 103, a fourth light source 104 and a fifth light source 105, and each grating pixel 13 includes a first grating sub-pixel 121, a second grating sub-pixel 122, a third grating sub-pixel 123, a fourth grating sub-pixel 124 and a fifth grating sub-pixel 125. The differences are that: the above light sources 10, as illustrated in FIG. 7a, further includes a sixth light source 106, and the sixth light source 106 emits yellow light. The grating pixel 13, as illustrated in FIG. 7c, further includes a sixth grating sub-pixel 126, and the sixth grating sub-pixel 126 is configured to filter for transmit light emitted by the sixth light source 106. In this case, the driving method further comprises:

At the sixth time period P6 of the time period of one frame T, the backlight driving signal BL inputs yellow light driving signal, and the sixth light source 106 as illustrated in FIG. 7a is lit and emits yellow light. Meanwhile, the LCD panel 20 is refreshed once, and the objective of adjusting the gray scale of the yellow light outputted by the light-adjusting pixels 200 at the sixth time period P6 can be achieved.

For instance, in order to make a refreshing frequency of the LCD panel 20 within the time period of one frame T homogenous, for instance, the first time period P1, the second time period P2, the third time period P3, the fourth time period P4, the fifth time period P5 and the sixth time period P6 respectively occupy ⅙ of the time period of one frame T.

For instance, in the driving method provided by the fourth embodiment, the fifth embodiment and the sixth embodiment, the LCD panel 20 is refreshed for at least four times within the time period of one frame T, so the requirement on the response speed of the LCD panel 20 is high. In order to solve the above problem, as illustrated in FIG. 5d, FIG. 6d and FIG. 7d, in the 3D display device, each light-adjusting pixel 200 can include a plurality of light-adjusting sub-pixels 210, and one light-adjusting sub-pixel 210 corresponds to one grating sub-pixel 12 (i.e. the light-adjusting sub-pixels have a one-to-one correspondence with the grating sub-pixels).

Figure 9:
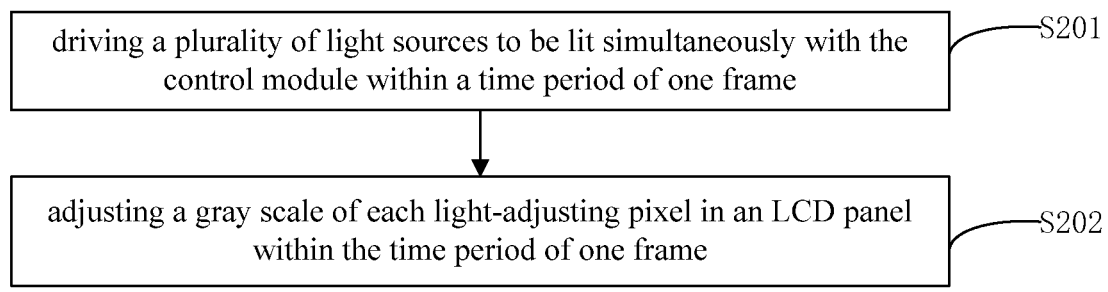
FIG. 9 is a schematic diagram illustrating another driving method of the 3D display device provided by the embodiment of the present disclosure.

For instance, the present disclosure provides a driving method of the 3D display device illustrated in FIG. 5d, FIG. 6d and FIG.7d, as illustrated in FIG. 9, the driving method comprises the following steps:

S201: driving a plurality of light sources 10 to be lit simultaneously with the control module 30 within a time period of one frame T; and S202: adjusting a gray scale of each light-adjusting pixel 210 in an LCD panel within the time period of one frame T.

For instance, adjusting a gray scale of each light-adjusting sub-pixel 210 in the light-adjusting pixel 210 of the LCD panel within the time period of one frame.

For instance, description has been given to the driving method of the 3D display device illustrated in FIG. 5d, FIG. 6d and FIG. 7d in the above embodiments. No further description will be given herein.

For instance, because each light-adjusting sub-pixel 210 is connected with one gate line and one data line which are intersected with each other, the LCD panel 20 can be refreshed once within the time period of one frame; all the gate lines are subjected to progressive scanning, so as to switch on all the light-adjusting sub-pixels 210 line by line; and the data lines can charge the light-adjusting sub-pixels 210 connected with the data lines so as to control the gray scale value of the light-adjusting sub-pixels 210, so as to make different light-adjusting sub-pixels 210 have different gray scales. On this basis, the plurality of light sources can be lit simultaneously within the time period of one frame T, such that the light-adjusting sub-pixel 210 corresponding to each grating sub-pixel 12 can output light with different colors. Because the plurality of light-adjusting sub-pixels 210 have different gray scales, the human eye can view light obtained after the mixing of the light with a plurality of colors and different gray scales outputted by the plurality of light-adjusting sub-pixels 210 within the time period of one frame T. Therefore, images displayed by the 3D display device can be further varied and exquisite, so that the resolution of the 3D display device can be improved.

The foregoing embodiments are only the particular embodiments of the present disclosure and not intended to limit the scopes of the present disclosure. Any modification or substitution that can be easily envisioned within the technical scopes disclosed by the present disclosure by those skilled in the art should fall within the scopes of the present disclosure. Therefore, the scopes of the present disclosure should be defined by the accompanying claims.

The application claims priority to the Chinese patent application No. 201610012302.X, filed Jan. 8, 2016, the entire disclosure of which is incorporated herein by reference as part of the present application.

What is claimed is:

1. A 3D display device, comprising a backlight module, a liquid crystal display (LCD) panel, and a control module, wherein,
    the backlight module comprises a light guide plate (LGP) and a plurality of light sources;
    light emitted by the plurality of light sources is at least partially incident onto the LGP;
    the plurality of light sources at least comprises a first light source, a second light source, and a third light source; colors of the light emitted by the first light source, the second light source, and the third light source are three primary colors;
    a plurality of grating pixels are disposed on a surface of the LGP at a light-exiting side of the LGP; each grating pixel at least comprises a first grating sub-pixel, a second grating sub-pixel, and a third grating sub-pixel; the first grating sub-pixel, the second grating sub-pixel, and the third grating sub-pixel are configured to filter for transmitting different light emitted by different light sources; the first grating sub-pixel, the second grating sub-pixel, and the third grating sub-pixel are respectively configured to filter for transmitting the light emitted by the first light source, the second light source, and the third light source;
    the LCD panel comprises a plurality of light-adjusting pixels; the light-adjusting pixels have a one-to-one correspondence with the grating pixels;
    the control module is connected with the backlight module and the LCD panel, and configured to drive the plurality of light sources to be lit sequentially or simultaneously within a time period of one frame, and to adjust a gray scale of each light-adjusting pixel in a time period of lighting each light source; and a plan where the first grating sub-pixel is located, a plane where the second grating sub-pixel is located, and a plane where the third grating sub-pixel is located are a same one plane.

2. The 3D display device according to claim 1, wherein the plurality of light sources are disposed at a side surface of the LGP.

3. The 3D display device according to claim 1, wherein emergent light of at least partial grating sub-pixels in each of the grating pixels has different angles; and
   an orientation angle of the first grating sub-pixel with respect to a first direction, an orientation angle of the second grating sub-pixel with respect to the first direction, and an orientation angle of the third grating sub-pixel with respect to the first direction are different from each other.

4. The 3D display device according to claim 1, wherein,
   the plurality of light sources further comprises a fourth light source which emits any one of cyan (C) light, magenta (M) light, and yellow (Y) light; and
   each grating pixel further comprises a fourth grating sub-pixel which is configured to filter for transmitting the light emitted by the fourth light source.

5. The 3D display device according to claim 4, wherein a cross section of the LGP is a quadrangle; and the first light source, the second light source, the third light source, and the fourth light source are respectively disposed at four side surfaces of the LGP.

6. The 3D display device according to claim 1, wherein,
   the plurality of light sources further comprises a fourth light source and a fifth light source; the fourth light source emits cyan light; the fifth light source emits magenta light or yellow light; and
   each grating pixel further comprises a fourth grating sub-pixel and a fifth grating sub-pixel which are respectively configured to filter for transmitting the light emitted by the fourth light source and the light emitted by the fifth light source.

7. A 3D display device, comprising a backlight module, a liquid crystal display (LCD) panel, and a control module, wherein,
   the backlight module comprises a light guide plate (LGP) and a plurality of light sources;
   light emitted by the plurality of the light sources is at least partially incident onto the LGP;
   the plurality of light source at least comprises a first light source, a second light source, and a third light source; colors of the light emitted by the first light source, the second light source, and the third light source are three primary colors;
   a plurality of grating pixel are disposed on a surface of the LGP at a light-exiting side of the LPG; each grating pixel at least comprises a first grating sub-pixel, a second grating sub-pixel, and a third grating sub-pixel; the first grating sub-pixel, the second grating sub-pixel, and the third grating sub-pixel are configured to filter for transmitting different light emitted by different light sources, the first grating sub-pixel, the second grating sub-pixel, and the third grating sub-pixel are respectively configured to filter for transmitting the light emitted by the first light source, the second light source, and the third light source;
   the LCD panel comprises a plurality of light-adjusting pixels; the light adjusting pixels have a one-to-one correspondence with the grating pixels;
   the control module is connected with the backlight module and the LCD panel, and configured to drive the plurality of the light source to be lit sequentially or simultaneously within a time period of one frame, and to adjust a gray scale of each light-adjusting pixel in a time period of each light source;
   the plurality of light sources further comprises a fourth light source and a fifth light source; the fourth light source emits cyan light; the fifth light source emits magenta light or yellow light;
   each grating pixel further comprises a fourth grating sub-pixel and a fifth grating sub-pixel which are respectively configured to filter for transmitting the light emitted by the fourth light source and the light emitted by the fifth light source; and
   a cross section of the LGP is a pentagon; and the first light source, the second light source, the third light source, the fourth light source, and the fifth light source are respectively disposed at five side surfaces of the LGP.

8. The 3D display device according to claim 1, wherein the plurality of light sources further comprises a fourth light source, a fifth light source, and a sixth light source; the fourth light source emits cyan light; the fifth light source emits magenta light; the sixth light source emits yellow light;
   each grating pixel further comprises a fourth grating sub-pixel, a fifth grating sub-pixel, and a sixth grating sub-pixel which are respectively configured to filter for transmitting the light emitted by the fourth light source, the fifth light source, and the sixth light source; and
   a cross section of the LGP is a hexagon; and the first light source, the second light source, the third light source, the fourth light source, the fifth light source, and the sixth light source are respectively disposed at six side surfaces of the LGP.

9. The 3D display device according to claim 1, wherein each light-adjusting pixel comprises a plurality of light-adjusting sub-pixels; and the light-adjusting sub-pixels have a one-to-one correspondence with the grating sub-pixels.

10. A method for driving the 3D display device according to claim 1, comprising:
    driving the plurality of light sources to be lit in sequence within a time period of one frame; and
    adjusting the gray scale of each light-adjusting pixel in a time period of lighting each light source.

11. The method according to claim 10, wherein, in the case that the plurality of light sources comprises the first light source, the second light source, the third light source, and a fourth light source, and each grating pixel at least comprises the first grating sub-pixel, the second grating sub-pixel, the third grating sub-pixel, and a fourth grating sub-pixel, the method comprises:
    lighting the first light source in a first time period of one frame, performing progressive scanning via gate lines of the LCD panel, and charging light-adjusting pixels via data lines, so that the light emitted by the first light source transmits through the first grating sub-pixels and is incident on the light-adjusting pixels corresponding to the first grating sub-pixels;
    lighting the second light source in a second time period of one frame, performing progressive scanning via the gate lines of the LCD panel, and charging the light-adjusting pixels via the data lines, so that the light emitted by the second light source transmits through the second grating sub-pixels and is incident on the light-adjusting pixels corresponding to the second grating sub-pixels;
    lighting the third light source in a third time period of one frame, performing progressive scanning via the gate lines of the LCD panel, and charging the light-adjusting pixels via the data lines, so that the light emitted by the third light source transmits through the third grating sub-pixels and is incident on the light-adjusting pixels corresponding to the third grating sub-pixels; and lighting the fourth light source in a fourth time period of one frame, performing progressive scanning via the gate lines of the LCD panel, and charging the light-adjusting pixels via the data lines, so that the light emitted by the fourth light source transmits through the fourth grating sub-pixels and is incident on the light-adjusting pixels corresponding to the fourth grating sub-pixels.

12. The method according to claim 11, wherein the first time period, the second time period, the third time period, and the fourth time period respectively occupy one quarter of the time period of one frame.

13. The method according to claim 11, wherein in the case that the light sources further comprise a fifth light source and each grating pixel further comprises a fifth grating sub-pixel, the method further comprises:

lighting the fifth light source in a fifth time period of one frame, performing progressive scanning via the gate lines of the LCD panel, and charging the light-adjusting pixels via the data lines, so that light emitted by the fifth light source transmits through the fifth grating sub-pixels and is incident on the light-adjusting pixels corresponding to the fifth grating sub-pixels.

14. The method according to claim 13, wherein the first time period, the second time period, the third time period, the fourth time period, and the fifth time period respectively occupy one fifth of the time period of one frame.

15. The method according to claim 13, wherein in the case that the light sources further comprise a sixth light source and each grating pixel further comprises a sixth grating sub-pixel, the method further comprises:

lighting the sixth light source in a sixth time period of one frame, performing progressive scanning via the gate lines of the LCD panel, and charging the light-adjusting pixels via the data lines, so that light emitted by the sixth light source transmits through the sixth grating sub-pixels and is incident on the light-adjusting pixels corresponding to the sixth grating sub-pixels.

16. The method according to claim 15, wherein the first time period, the second time period, the third time period, the fourth time period, the fifth time period, and the sixth time period respectively occupy one sixth of the time period of one frame.

17. A method for driving the 3D display device according to claim 9, comprising:

driving the plurality of light sources to be lit simultaneously within a time period of one frame, and adjusting the gray scale of each light-adjusting pixel.

18. The method according to claim 17, wherein the adjusting the gray scale of each light-adjusting pixel comprises adjusting a gray scale of each light-adjusting sub-pixel in each light-adjusting pixel within the time period of one frame.

19. A 3D display device, comprising a backlight module, a liquid crystal display (LCD) panel, and a control module, wherein, the backlight module comprises a light guide plate (LGP) and a plurality of light sources;

light emitted by the plurality of light sources is at least partially incident onto the LGP;

the plurality of light sources at least comprises a first light source, a second light source, and a third light source; colors of the light emitted by the first light source, the second light source, and the third light source are three primary colors;

a plurality of grating pixels are disposed on a surface of the LGP at a light-exiting side of the LGP; each grating pixel at least comprises a first grating sub-pixel, a second grating sub-pixel, and a third grating sub-pixel, which are respectively configured to filter for transmitting the light emitted by the first light source, the second light source, and the third light source;

a color of light exiting the LGP via the first grating sub-pixel, a color of light exiting the LGP via the second grating sub-pixel, and a color of light exiting the LGP via the third grating sub-pixel are different from each other;

the first grating sub-pixel, the second grating sub-pixel, and the third grating sub-pixel are spaced apart from each other;

the LCD panel comprises a plurality of light-adjusting pixels; each of the light-adjusting pixels corresponds to one first grating sub-pixel, one second grating sub-pixel, and one third grating sub-pixel, and is configured to adjust a gray scale of light emitted by the first light source, a gray scale of light emitted by the second light source, and a gray scale of light emitted by the third light source at different times;

the control module is connected with the backlight module and the LCD panel, and configured to drive the plurality of light sources to be lit sequentially within a time period of one frame, and to adjust a gray scale of each light-adjusting pixel in a time period of lighting each light source;

a plane where the first grating sub-pixel is located, a plane where the second grating sub-pixel is located, and a plane where the third grating sub-pixel is located are a same one plane;

the light guide comprises at least a first light incident plane, a second light incident plane, and a third incident plane;

at least part of light emitted by the first light source enters into the light guide plate via the first incident plane;

at least part of light emitted by the second light source enters into the light guide plate via the second light incident plane;

at least part of light by the third light source enters into the light guide plate via the third light incident plane; and an orthographic projection of the first light incident plane on the third light incident plane at least partially overlaps the third light incident plane.

\* \* \* \* \*